United States Patent
Inukai

(10) Patent No.: US 8,514,466 B2
(45) Date of Patent: Aug. 20, 2013

(54) IMAGE READER AND IMAGE READING METHOD

(75) Inventor: Yoshihiro Inukai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 354 days.

(21) Appl. No.: 13/064,104

(22) Filed: Mar. 7, 2011

(65) Prior Publication Data

US 2011/0222133 A1    Sep. 15, 2011

(30) Foreign Application Priority Data

Mar. 12, 2010 (JP) ................................. 2010-056288
Jan. 14, 2011 (JP) ................................. 2010-006053

(51) Int. Cl.
*H04N 1/04* (2006.01)
(52) U.S. Cl.
USPC ............ 358/474; 358/482; 358/483; 358/497
(58) Field of Classification Search
USPC .......................... 358/474, 482, 483, 497, 498
See application file for complete search history.

(56) References Cited

U.S. PATENT DOCUMENTS

| 4,691,114 | A | * | 9/1987 | Hasegawa et al. ............ 358/474 |
| 5,701,505 | A | * | 12/1997 | Yamashita et al. ............. 712/11 |
| 7,474,437 | B2 | * | 1/2009 | Ishido ............................ 358/1.9 |
| 7,702,147 | B2 | | 4/2010 | Inukai |
| 2006/0274389 | A1 | | 12/2006 | Inukai |
| 2007/0121169 | A1 | | 5/2007 | Inukai |
| 2009/0316233 | A1 | | 12/2009 | Inukai |

FOREIGN PATENT DOCUMENTS

| JP | 2001024859 | 1/2001 |
| JP | 3701621 | 7/2005 |
| JP | 2007235852 | 9/2007 |
| JP | 2010074289 | 4/2010 |

OTHER PUBLICATIONS

Abstract of Japanese Patent Publication No. JP2003-283764, published on Oct. 3, 2003.

* cited by examiner

*Primary Examiner* — Houshang Safaipour
(74) *Attorney, Agent, or Firm* — Harness, Dickey & Pierce, P.L.C.

(57) ABSTRACT

An image reader includes a first line sensor that reads first image lines of an original document; a second line sensor that reads second image lines of the original document, the second image lines being located apart from the first image lines in a sub-scanning direction, respectively; and a control unit configured to, in the case where an abnormality occurs during reading of a first image line by the first line sensor, alternately switch reading of the first image lines by the first line sensor and reading of the second image lines by the second line sensor at a time point when a reading position of the second line sensor reaches a reading stop position of the first line sensor at which the abnormality has occurred.

13 Claims, 23 Drawing Sheets

NORMAL OPERATION

READING STOPPAGE

DUAL MODE (WHEN IMAGE DATA OF SENSOR 208a IS OUTPUT)

DUAL MODE (WHEN IMAGE DATA OF SENSOR 208b IS OUTPUT)

IMAGE READER AND IMAGE READING METHOD

CROSS-REFERENCE TO RELATED APPLICATIONS

The present application claims priority to and incorporates by reference the entire contents of Japanese Patent Application No. 2010-056288 filed in Japan on Mar. 12, 2010 and Japanese Patent Application No. 2011-006053 filed in Japan on Jan. 14, 2011.

BACKGROUND OF THE INVENTION

1. Field of the Invention

The present invention relates to an image reader and an image reading method.

2. Description of the Related Art

In some cases, an image reader temporarily stops reading an original document during reading operation by moving a carriage or the original document. This discontinuous operation is referred to as intermittent operation hereinafter. Examples of the factors inducing intermittent operation include electrical noises and a case where image is not normally read due to any cause (if reading continues after the occurrence of the case, image quality deteriorates). When such intermittent operation factor occurs, moving operation of the carriage or the original document needs to temporarily stop until the intermittent operation factor is eliminated. If the moving operation of the carriage or the original document does not stop, discontinuity occurs between image data before the temporary stop of reading and image data after the resuming of reading.

The carriage or the original document cannot instantly stop from a steady speed (a moving speed thereof when image of the original document is read) or instantly reach the steady speed from the stopped state because the moving speed of the carriage or the original document is governed by the law of inertia. In other words, the carriage or the original document needs to stop after deceleration from the steady speed or to reach the steady speed after acceleration from the stopped state. If image of the original document is read during deceleration or acceleration, abnormality such as distortion occurs in read image data because the moving speed of the carriage or the original document differs from that in reading at the steady speed.

The following methods have been known as those for preventing such problem. A first method is as follows: when reading of image of an original document is temporarily stopped in flatbed reading or automatic document feeder (ADF) reading, a carriage or the original document is returned from a position at which reading is stopped (a reading stop position) by a distance necessary for acceleration when reading resumes, and stopped. Reading of image restarts when the carriage or the original document reaches the reading stop position. For example, refer to Japanese Patent Application Laid-open No. 2001-024859. This method can prevent the occurrence of abnormality caused by intermittent operation because no discontinuity occurs between image data before the temporary stop of reading and image data after the resuming of reading, and also image of the original document is read only at a stable moving speed of the carriage or the original document. A second method is based on a point of view that the ADF generally cannot feed an original document in a returning direction, and as follows: when reading of image of an original document is temporarily stopped in ADF reading, a carriage is moved in an original document feed direction by a distance corresponding to an overrun of the original document after reading is stopped, and stopped. Reading operation of the original document resumes from the stopped position. For example, refer to Japanese Patent No. 3701621. This method can also prevent the occurrence of abnormality caused by intermittent operation because no discontinuity occurs between image data before the temporary stop of reading and image data after the restarting of reading, and image of the original document is read only at a stable moving speed of the original document.

The related art, however, has a problem in that operation is cumbersome. When reading of image of an original document is temporarily stopped due to the occurrence of an intermittent operation factor, it is required that the movement of a carriage or the original document needs to be stopped every occurrence of the intermittent operation factor, and the carriage or the original document is moved in the returning direction, or the carriage is moved in an original document feed direction in ADF reading in which the original document cannot be fed in the returning direction.

The applicant of the present invention proposed an image reader and an image reading method in Japanese Patent Application No. 2008-236878 (Japanese Patent Application Laid-open No. 2010-074289) to address the problems of the related art. The image reader and the image reading method employ first and second line sensors that read image of an original document at positions located physically apart from each other in a sub-scanning direction. The use of the two line sensors enables image data of the original document to be made continuous before the temporary stop of reading and after the resuming of reading when reading of the original document is temporarily stopped due to the occurrence of an intermittent operation factor, without stopping the movement of the carriage or the original document every occurrence of the intermittent operation factor as in related art. Japanese Patent Application No. 2008-236878, however, newly arises problems in that the structure becomes complex, thereby increasing costs because the use of the first and second line sensors for reading image of the original document requires analog front ends (AFE) that digital-convert analog image signals and other processing units that carry out necessary correction processing for the two line sensors, for example.

SUMMARY OF THE INVENTION

It is an object of the present invention to at least partially solve the problems in the conventional technology.

According to an aspect of the present invention, there is provided an image reader that includes a first line sensor that reads first image lines of an original document; a second line sensor that reads second image lines of the original document, the second image lines being located apart from the first image lines in a sub-scanning direction, respectively; and a control unit configured to, in the case where an abnormality occurs during reading of a first image line by the first line sensor, alternately switch reading of the first image lines by the first line sensor and reading of the second image lines by the second line sensor at a time point when a reading position of the second line sensor reaches a reading stop position of the first line sensor at which the abnormality has occurred.

According to another aspect of the present invention, there is provided an image reading method performed in an image reader. The image reader includes a first line sensor that reads first image lines of an original document and a second line sensor that reads second image lines of the original document, the second image lines being located apart from the first image lines in a sub-scanning direction, respectively. The method includes alternately switching, in the case where an abnormality occurs during reading of a first image line by the first line sensor, reading of the first image lines by the first line sensor and reading of the second image lines by the second line sensor at a time point when a reading position of the second line sensor reaches a reading stop position of the first line sensor at which the abnormality has occurred.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of the present invention is described in detail below with reference to the accompanying drawings. In the following embodiment, an image reader according to the present invention is applied to a multifunction full-color digital copying machine. However, the present invention can be applied to various kinds of apparatuses as long as the apparatuses read image of an original document by a line sensor while a carriage or the original document is moved.

Figure 1:
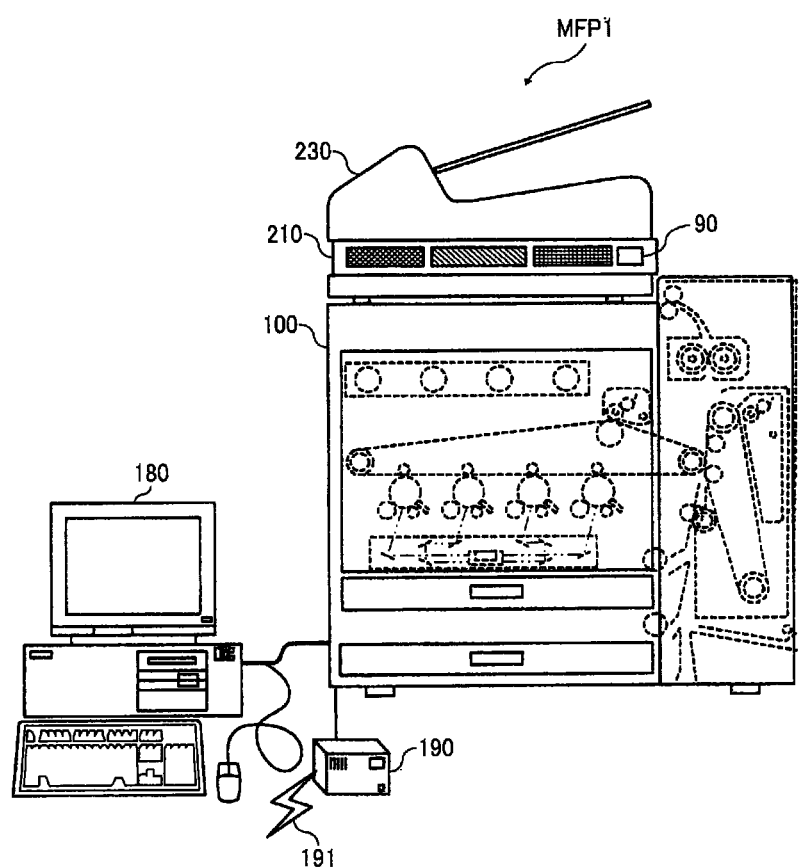
FIG. 1 is a schematic illustrating an overall structure of a multifunction full-color digital copying machine (MFP) according to an embodiment of the present invention.

FIG. 1 is a schematic illustrating a multifunction full-color digital copying machine (hereinafter, referred to as an MFP) according to the embodiment of the present invention. An MFP 1 includes, as its main components, an automatic document feeder (ADF) 230, an operation board 90, a color scanner 210, and a color printer 100. In general, the operation board 90 and the color scanner 210 provided with the ADF 230 are detachable from the color printer 100. The operation board 90 is an operation unit with which a user operates each function of the MFP 1. The color scanner 210 includes a sensor board unit (SBU) having a motor driver, various kinds of sensor inputs, and a controller (scanner controller), and reads image of an original document with operational timing controlled by a CPU (a CPU 261 of FIG. 3) built in the MFP 1 while the SBU directly or indirectly communicates with the CPU. The color printer 100 prints out image data read by the color scanner 210 on a sheet. The sheet after printing of the color printer 100 is discharged to a discharge stack (not illustrated).

Figure 3:
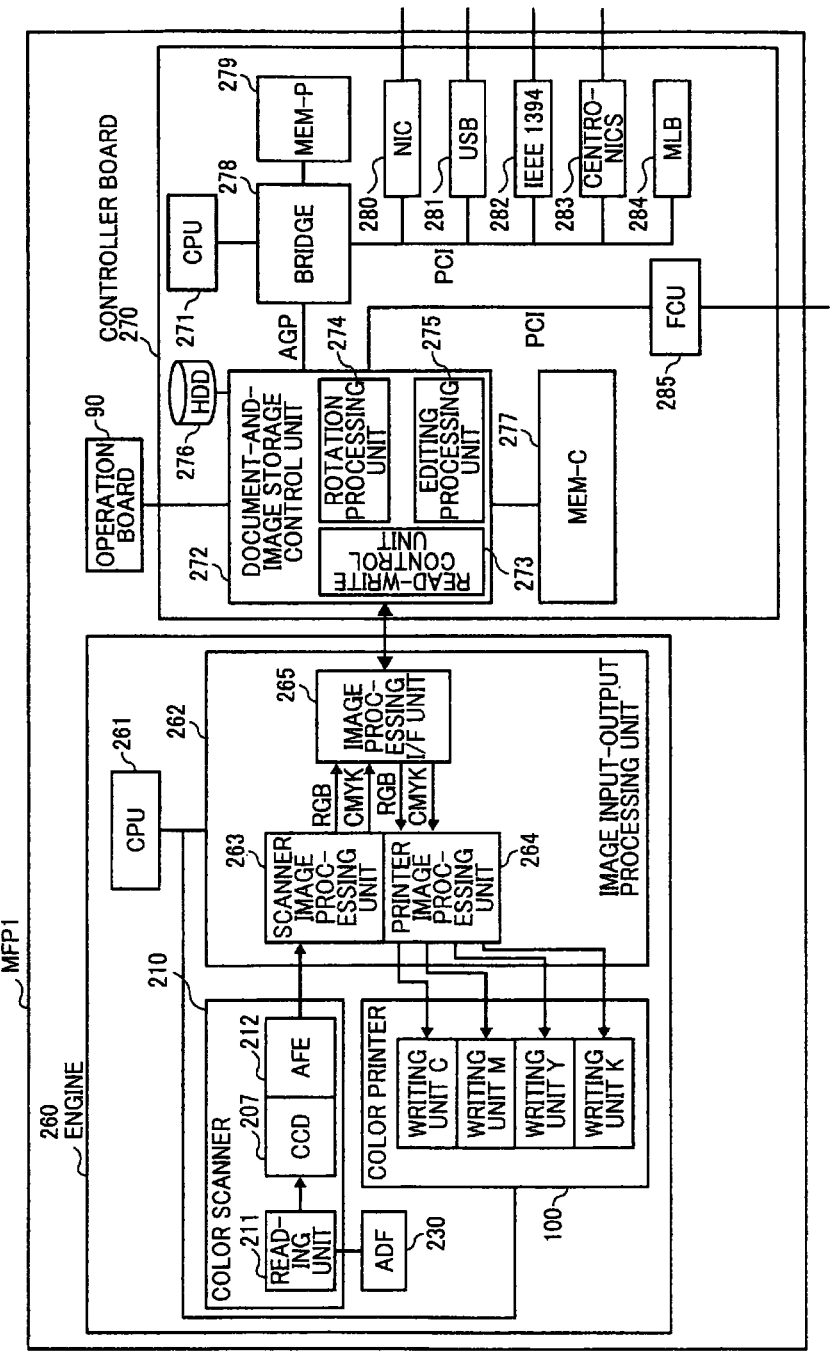
FIG. 3 is a schematic illustrating a specific structural example of an image data processing system of the MFP.

The MFP 1 also includes a controller board (a controller board 270 of FIG. 3). The MFP 1 can transmit and receive image data between itself and a terminal apparatus 180 such as a personal computer (PC) coupled thereto through a local area network (LAN) interposed via the controller board, for example. The controller board further includes a facsimile control unit (FCU) that executes a facsimile function (an FCU 285 of FIG. 3). The FCU is coupled to a telephone line (PN) 191 by an exchange (PBX) 190, and can transmit and receive image data between itself and a facsimile machine of the other side by facsimile.

Figure 2:
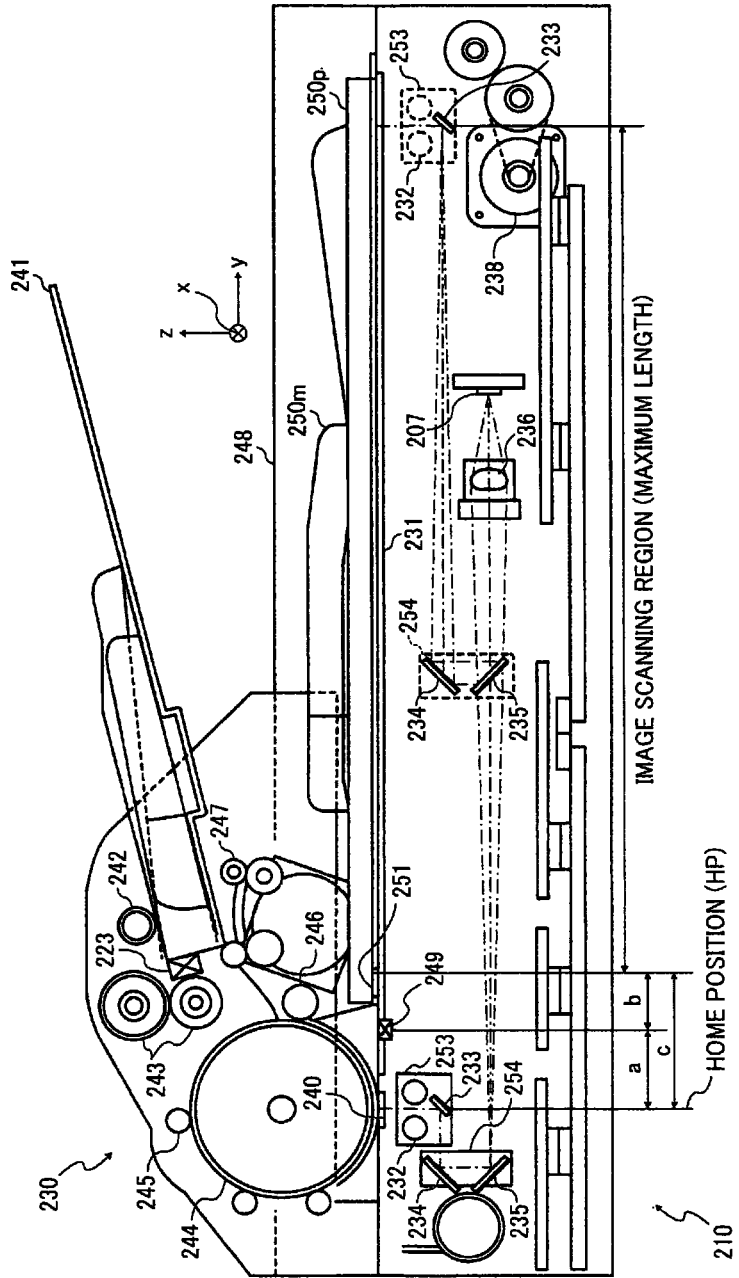
FIG. 2 is a schematic illustrating a structural example of a color scanner and an original document image reading mechanism of an ADF mounted to the color scanner of the MFP.

FIG. 2 is a schematic illustrating a specific structural example of an original document image reading mechanism of the color scanner (hereinafter, simply referred to as a scanner) 210 and the ADF 230 mounted to the scanner 210. An original document placed on an exposure glass 231 of the scanner 210 is lighted by a lighting lamp 232. Reflection light (image light) from the original document is reflected by a first mirror 233 in parallel with a sub-scanning direction y. The lighting lamp 232 and the first mirror 233 are mounted to a first carriage 253 driven in the sub-scanning direction γ with a constant speed. A second carriage 254 is driven in the same direction of the first carriage 253 at a half speed of that of the first carriage 253, and has a second mirror 234 and a third mirror 235 mounted thereto. Image light reflected by the first mirror 233 is reflected by the second mirror 234 downward in a minus z direction, and reflected by the third mirror 235 in the sub-scanning direction y. Then, image light is converged by a lens 236 to enter a charge coupled device (CCD) (line sensor) 207, in which image light is converted into an electrical signal.

A running body motor 238 serving as a driving source drives the first carriage 253 and the second carriage 254 so as to reciprocate in the sub-scanning direction y: one direction is for scanning an original document, and the other direction is for returning. As described above, the speed of the second carriage 254 is half of that of the first carriage 253. The second carriage 254, thus, runs half the distance that the first carriage 253 runs. As illustrated in FIG. 2, for example, when the first carriage 253 moves by the maximum length of an image operation region, the second carriage 254 whose shape is indicated with the broken line is positioned at a half of the maximum length.

In this way, in the scanner 210, an original document placed on the exposure glass 231 is scanned by the lighting lamp 232 and the first mirror 233 that are included in the first carriage 253, and an original document image is projected to the CCD 207 by the second mirror 234 and the third mirror 235 that are included in the second carriage 254. In other words, the scanner 210 is a flatbed original document scanner. The scanner 210 has a glass 240 serving as a sheet-through reading window at a reading view position of the first mirror 233 when the first carriage 253 stops at a home position (waiting position) HP, and can execute sheet-trough reading through the glass 240. The ADF 230 is mounted above the glass 240. The ADF 230 has a carriage drum (platen) 244 facing the glass 240. In FIG. 2, the second carriage 254 stops at the position where the shape of the second carriage 254 is indicated with the actual line.

An original document, from original documents loaded on an original document tray 241 of the ADF 230, is fed into a gap between the carriage drum 244 and a pushing roller 245 by a pick-up roller 242 and a pair of registration rollers 243. The original document adheres to the carriage drum 244 and passes on the reading glass 240. Thereafter the original document is carried by discharging rollers 246 and 247 so as to be discharged onto a discharge tray that is provided under the original document tray 241 and serves as a pressurizing plate.

An image on a surface of the original document is irradiated by the lighting lamp 232 having moved at the HP, i.e., directly under the glass 240, when the original document passes on the reading glass 240 serving as an original document reading window. Reflected light from the surface of the original document enters the CCD 207 via an optical system composed of the first mirror 233, the second mirror 234, and the third mirror 235 so as to be photoelectrically converted. In other words, reflected light is converted into RGB color image signals. The surface of the carriage drum 244 faces the reading glass 240 as a white backboard and has white color so as to serve as a standard white surface. A standard white plate 239 described later has the same function of the standard white surface.

The standard white plate 239 and a base point sensor 249 that detects the first carriage 253 are disposed between the reading glass 240 and a scale 251 for positioning the front edge of an original document. The standard white plate 239 corrects (shading correction) a phenomenon in which read data fluctuates even though the data is read from an original document having a uniform density. The phenomenon is caused by fluctuation of light emitting intensity among the lighting lamps 232, fluctuation of a main-scanning direction, and sensitivity fluctuation of pixels of the CCD 207, for example.

A base body 248 of the ADF 230 is connected to the base body of the scanner 210 with hinges (hinge-connection) at a rear side of the base body 248 (rear in FIG. 2). The ADF 230 can be lifted up (opened) by pulling up the base body 248 of the ADF 230 with a handgrip 250$m$ provided at a front side of the base body 248 (front in FIG. 2). At the rear side of the base body 248 of the ADF 230, a switch is provided that detects open and close of the ADF 230. A pressurizing plate 250$p$ is mounted at a bottom section of the ADF 230 so as to face the exposure glass 231. When the ADF 230 is closed, the lower surface of the pressurizing plate 250$p$ makes close contact with the upper surface of the exposure glass 231 as illustrated in FIG. 2.

FIG. 3 is a schematic illustrating a specific structural example of a data processing system of the multifunction color digital copying machine (MFP) 1 of FIG. 1. The MFP 1 includes an engine 260 that executes original document image reading and color printing, the controller board 270 that executes necessary control of the whole of the MFP 1, and the operation board 90 serving as a user interface. The operation board 90 receives input operation from a user, and displays information to the user.

The engine 260 includes the CPU 261 that controls processing of image reading and printing, the color scanner 210 provided with the ADF 230, the color printer 100, and an image input-output processing unit 262 composed of application specific ICs (ASICs).

The color scanner 210 includes a reading unit 211 having the first and the second carriages, the CCD 207, and an analog front end (AFE) 212. The color scanner 210 includes the sensor board unit (SBU), which is omitted from illustration of FIG. 3. The SBU includes a scanner controller composed of a CPU, a ROM, and a RAM. The CPU reads computer programs from the ROM storing the programs to the RAM, and executes the programs so as to control the whole of the scanner 210. The CPU of the SBU is coupled to the CPU 261 for controlling the processing of image reading and printing through communication lines. The CPU executes operation instructed by the CPU 261 while transmitting and receiving commands and data between itself and the CPU 261. The CPU of the SBU also controls detection and ON-OFF of an original document detection sensor, an HP sensor, a pressurizing plate open close sensor, and a cooling fan, for example. The SBU also includes a motor driver. The motor driver is driven by a PWM output from the CPU so as to generate an exciting pulse sequence to drive pulse motors, such as a running body (carriage) motor and an ADF motor.

An original document image is read by the reading unit 211 as described with reference to FIG. 2, and imaged to the CCD 207 including three line sensors for R, G, and B. The line sensors of the CCD 207 each receiving a driving clock from the CPU of the SBU output analog images for respective pixels of R, G, and B. The AFE 212 processes the analog image signals to convert the analog image signals into RGB image data by analog-to-digital conversion (A/D conversion). In the present invention, the line sensor of the CCD 207 includes a set of two line sensors that read images located physically apart from each other on an original document. The two line sensors are described later.

The image input-output processing unit 262 includes a scanner image processing unit 263, a printer image processing unit 264, and an image processing interface unit (image processing I/F unit) 265. The scanner image processing unit 263 carries out shading correction, reading γ correction, and modulation transfer function (MTF) correction on RGB image data output from the AFE 212 included in the color scanner 210. The scanner image processing unit 263 converts RGB image data after correction into CMYK recording color data when needed. In the present invention, the scanner image processing unit 263 includes an image switching unit and an image interpolation unit. These units are described later. The printer image processing unit 264 converts RGB image data or CMYK recording color data into CMYK printing data that matches image expression characteristics of writing units of the CMYK colors of the color printer 100. The image processing I/F unit 265 transfers RGB image data or CMYK recording color data from the scanner image processing unit 263 to the printer image processing unit 264 or the controller board 270. In addition, the image processing I/F unit 265 receives RGB image data or CMYK recording color data from the controller board 270, and transfers the data to the printer image processing unit 264.

The controller board 270 includes a CPU 271, a document-and-image storage control unit 272 composed of ASICs, a hard disk drive (HDD) 276, a local memory (MEM-C) 277, a bridge 278, a system memory (MEM-P) 279, a network interface card (NIC) 280, a USB device 281, an IEEE 1394 device 282, a Centronics device 283, an MLB 284, and the facsimile control unit (FCU) 285. The operation board 90 is coupled to the document-and-image storage control unit 272 of the controller board 270.

The document-and-image storage control unit 272 includes a rotation processing unit 274 and an editing processing unit 275 in addition to a read-write control unit 273 that controls the HDD 276 and the MEM-C 277. The rotation processing unit 274 and the editing processing unit 275 carry out rotation, magnification changing, and other processing on image data according to user's input. The HDD 276 is a nonvolatile storage that stores therein image data, document data, computer programs, font data, forms, and lookup tables (LUTs). The local memory (MEM-C) 277 is a volatile storage used as a buffer for a plurality of printing image and a code buffer. The system memory 279 is also a volatile storage used for a drawing memory of the MFP 1, for example.

The bridge 278 is coupled with the CPU 271, the document-and-image storage control unit 272, the system memory 279, and the devices from the NIC 280 to the MLB 284. The document-and-image storage control unit 272 and the bridge 278 are coupled with an accelerated graphics port (AGP). The NIC 280, the USB device 281, the IEEE 1394 device 282, the Centronics device 283, and the MLB 284 are coupled to the bridge 278 with a peripheral component interconnect (PCI) bus. The FCU 285 is coupled to the document-and-image storage control unit 272 with another PCI bus.

The CPU 271 controls the whole of the MFP 1. The CPU 271 can transmit and receive document-and-image information between itself and a personal computer coupled to the LAN through the bridge 278 and the NIC 280, or another personal computer through the Internet. The CPU 271 can also communicate with personal computers, printers, and digital cameras by using the USB 281, the IEEE 1394 device 282, and the Centronics device 283 through the bridge 278.

The MLB 284 is a board that couples the controller board 270 to the engine 260 through the PCI bus. The MLB 284 converts, for example, document-and-image data externally input through the NIC 280 into image data, and outputs the image data after conversion to the engine 260. The image data after conversion can also be stored in the HDD 276 through the document-and-image storage control unit 272.

In FIG. 3, the arrows indicate image data flow between the color scanner 210 and the image input-output processing unit 262, between the image input-output processing unit 262 and the color printer 100, and between the image input-output processing unit 262 and the document-and-image storage control unit 272. Based on the image data flow, general operation of the MFP 1 is described below.

First, the description is made when one print is made from one original document, i.e., one-copy processing. The color scanner 210 reads an original document by the reading unit 211, and outputs a read image as an RGB analog image signal from the CCD 207. The analog image signal is converted into digital data by the AFE 212 and is output to the image input-output processing unit 262. In the image input-output processing unit 262, the scanner image processing unit 263 receives digitalized RGB image data, and carries out necessary correction processing on the data, and thereafter converts the data into CMYK recording color data. The CMYK recording color data is sent from the scanner image processing unit 263 to the printer image processing unit 264 through the image processing I/F unit 265. The printer image processing unit 264 carries out magnification changing, image processing, γ conversion, and gradation processing on the CMYK recording color data when needed so as to match the image expression characteristics of the writing units corresponding to the respective CMYK colors of the color printer 100. The printer image processing unit 264 outputs the CMYK printing data thus matched by the processing to the writing units corresponding to the respective colors. The color printer 100 executes image forming operation based on the CMYK printing data.

Then the description is made when a plurality of prints are made from one original document to be read, i.e., continuous copying. The color scanner 210 reads an original document by the reading unit 211, and outputs a read image as an RGB analog image signal from the CCD 207. The analog image signal is converted into a digital signal by the AFE 212 and is output to the image input-output processing unit 262. In the image input-output processing unit 262, the scanner image processing unit 263 receives digitalized RGB image data, and carries out necessary correction processing on the data, and thereafter converts the data into CMYK recording color data. The CMYK recording color data is sent from the scanner image processing unit 263 to the document-and-image storage control unit 272 of the controller board 270 through the image processing I/F unit 265, in this case. The document-and-image storage control unit 272 temporarily stores the CMYK recording color data sent from the scanner image processing unit 263 in the local memory 277. The stored data is read every execution of printing on one sheet, and sent from the document-and-image storage control unit 272 to the printer image processing unit 264 through the image processing I/F unit 265. The printer image processing unit 264 carries out magnification changing, image processing, γ conversion, and gradation processing on the CMYK recording color data when needed so as to match the image expression characteristics of the writing units corresponding to the respective CMYK colors of the color printer 100. The printer image processing unit 264 outputs the CMYK printing data thus matched by the processing to the writing units corresponding to the respective colors. The color printer 100 executes image forming operation based on the CMYK printing data.

When an original document image read by the color scanner 210 is stored, RGB image data output from the scanner image processing unit 263 is sent to the document-and-image storage control unit 272 through the image processing I/F unit 265, and stored in the HDD 276. When an original document image read by the color scanner 210 is transmitted to the outside, RGB image data output from the scanner image processing unit 263 is sent to the document-and-image storage control unit 272 through the image processing I/F unit 265 in the same manner as described above, and temporarily stored in the HDD 276 or the local memory 277. Thereafter, the data is transmitted to the outside by the NIC 280, for example, through the bridge 278.

In addition, when image data stored in the HDD 276 as described above or image data received from the outside is printed by the color printer 100, RGB image data stored in the HDD 276 or RGB image data received from the outside is sent to the image processing I/F unit 265 through the document-and-image storage control unit 272, and transferred to the printer image processing unit 264. The printer image processing unit 264 converts the RGB image data into CMYK recording color data, and carries out magnification changing, image processing, γ conversion, and gradation processing when needed, and outputs the CMYK printing data thus matched by the processing to the writing units corresponding to the respective colors. The color printer 100 executes image forming operation based on the CMYK printing data.

An image reader and an image reading method of the present invention are described in detail below.

Figure 4:
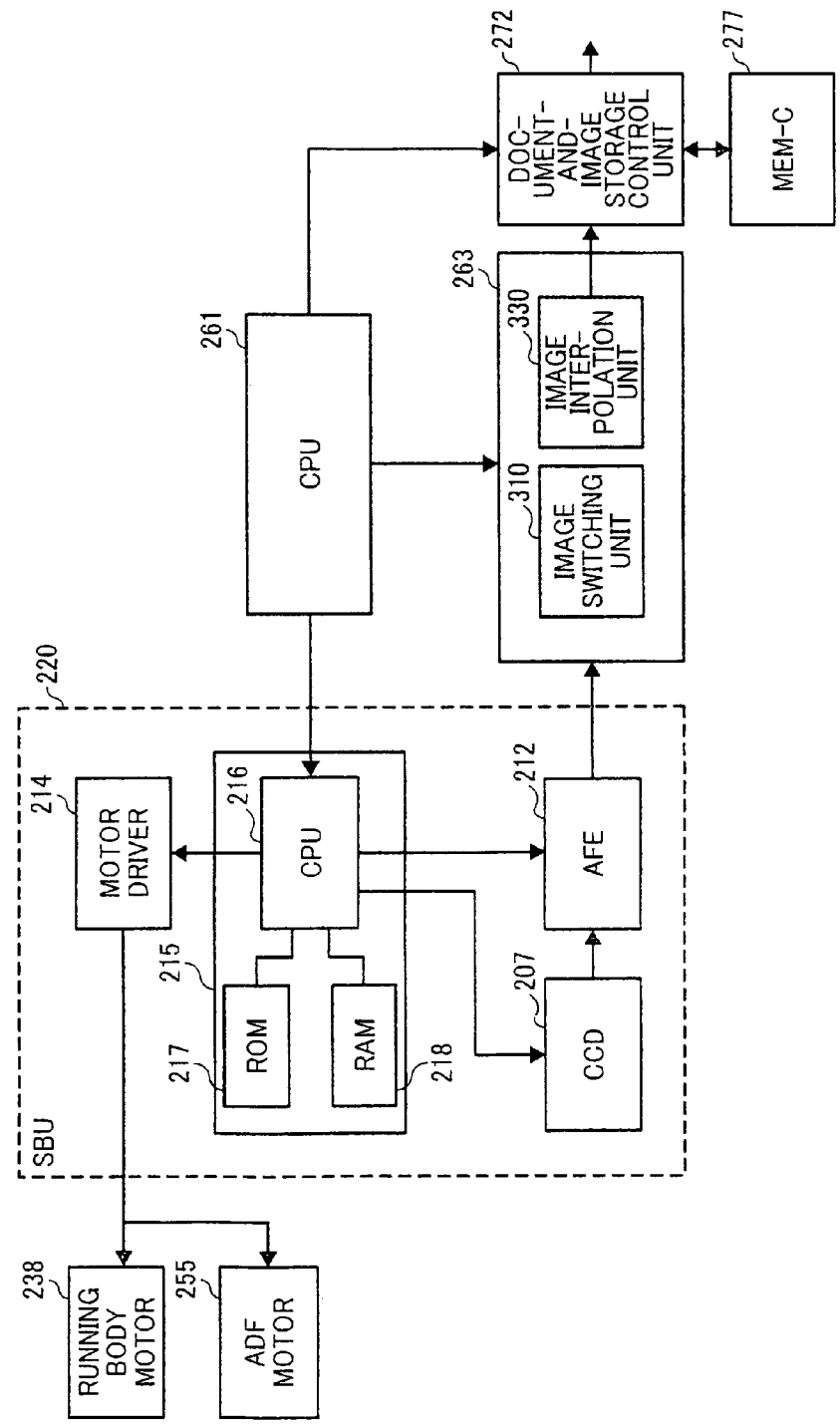
FIG. 4 is a block diagram illustrating a structure relating to an image reader of the present invention in the MFP.

FIG. 4 is a block diagram illustrating a structure relating to an image reader of the present invention in the MFP 1. In FIG. 4, a sensor board unit (SBU) 220 of the scanner 210 is indicated with the broken line. The SBU 220 includes a scanner controller 215 composed of a CPU 216, a ROM 217, and a RAM 218. The CPU 216 reads computer programs from the ROM 217 storing the programs to the RAM 218 and executes the programs so as to control the whole of the scanner 210. The CPU 216 is coupled to the CPU 261 for processing control through communication lines. The CPU 216 receives, for example, commands from the CPU 261 and executes operation instructed by the commands, or transmits, for example, status or data to the CPU 261. Here, the CPU 261 and the CPU 216 function as the control unit of the present invention.

The CPU 216 outputs a PWM pulse to a motor driver 214 in response to a command and the like from the CPU 261. The motor driver 214 is driven by the PWM output pulse so as to generate an exciting pulse sequence to drive the running body motor 238 or an ADF motor 255. The CPU 216 measures the number of generated PWM pulses so as to detect an original document reading position of the CCD 207. Specifically, the CPU 216 detects the position of the first carriage 253 moved by the running body motor 238 (refer to FIG. 2) or the position of an original document moved by the ADF motor 255. The CPU 216 transmits the detection data to the CPU 261.

The CCD 207 reads an original document under control of the CPU 216 according to the movement of the carriage or the original document, and outputs an analog image signal of the original document to the AFE 212. The AFE 212 A/D-converts the analog image signal and outputs the resulting image data to the scanner image processing unit 263. The scanner image processing unit 263 carries out predetermined correction processing on the image data. The image data after correction processing is temporarily stored in the local memory 277, for example, through the document-and-image storage control unit 272 when needed. The CCD 207 includes a first line sensor and a second line sensor that read image lines of an original document that are physically located apart from each other in the sub-scanning direction on the original document. The two line sensors will be described in detail later. The scanner image processing unit 263 includes an image switching unit 310 and an image interpolation unit 330 at the former stage of the correction processing function.

The CPU 261 watches whether any factors capable of inducing intermittent operation occur. Examples of such factors inducing intermittent operation include electrical noises and a case where an image is not normally read due to any cause. The CPU 261, for example, takes in image data directly from the AFE 212 and checks whether the data is normal. Alternatively, the CPU 216 may check image data whether the data is normal, and notify the CPU 261 of the result.

When an intermittent operation factor occurs, the CPU 261 outputs a reading stop signal to the scanner image processing unit 263. When the intermittent operation factor is eliminated, the CPU 261 outputs a reading restart signal to the scanner image processing unit 263. The CPU 261 instructs, when needed, the CPU 216 to switch the operation mode of the CCD 207 from one to another.

The CCD 207 normally operates with a single mode in which a signal from one line sensor alone is output. When an intermittent operation factor occurs and the factor is eliminated, the CCD 207 operates with a dual mode in which signals of both line sensors are alternately output for a certain period of time.

When receiving the reading stop signal from the CPU 261, the scanner image processing unit 263 stops reading image data output from the AFE 212, while when receiving the reading restart signal from the CPU 261, the scanner image processing unit 263 restarts reading image data. Meanwhile, the image switching unit 310 rearranges pieces of image data output from either one or both of the line sensors of the CCD 207. The image interpolation unit 330 carries out interpolation processing to produce missing image data during the dual mode of the CCD 207. The details of the image switching unit 310 and the image interpolation unit 330 are described later.

Figure 5:
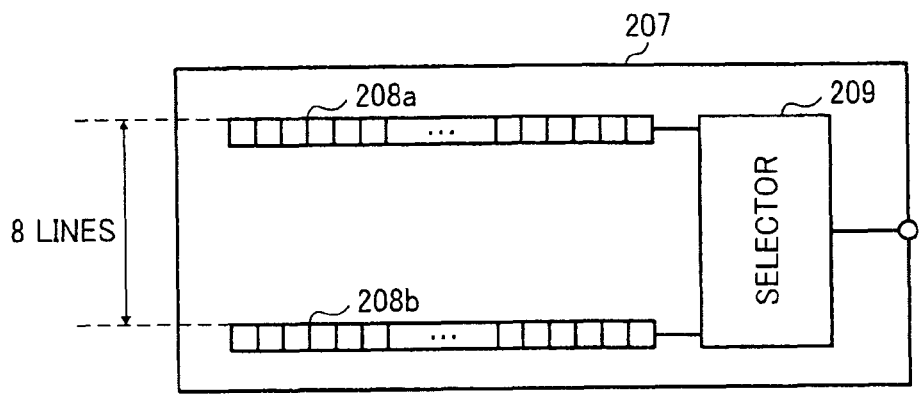
FIG. 5 is a schematic illustrating a basic structure of a CCD used in the present invention.

FIG. 5 is a schematic illustrating a basic structure of the CCD 207 used in the embodiment. The CCD 207 includes line sensors 208$a$ and 208$b$ serving as line sensors that read image lines of an original document. The line sensors 208$a$ and 208$b$ are disposed at positions physically spaced apart from each other (in the embodiment, by eight lines). Accordingly, the line sensors 208$a$ and 208$b$ can read image lines at different positions of the original document (the difference is eight lines in the sub-scanning direction, herein) in the sub-scanning direction.

The CCD 207 has three operation modes: mode A in which a signal of the line sensor 208$a$ is output; mode B in which a signal of the line sensor 208$b$ is output; and a dual mode in which signals of the line sensors 208$a$ and 208$b$ are alternately output on a line-by-line basis. The three operation modes are switched from one another under control of the CPU 216 (the CPU 216 is controlled by the CPU 261). A selector 209 selects a signal of either the line sensor 208$a$ or 208$b$ to be output under control of the CPU 216.

Figure 6:
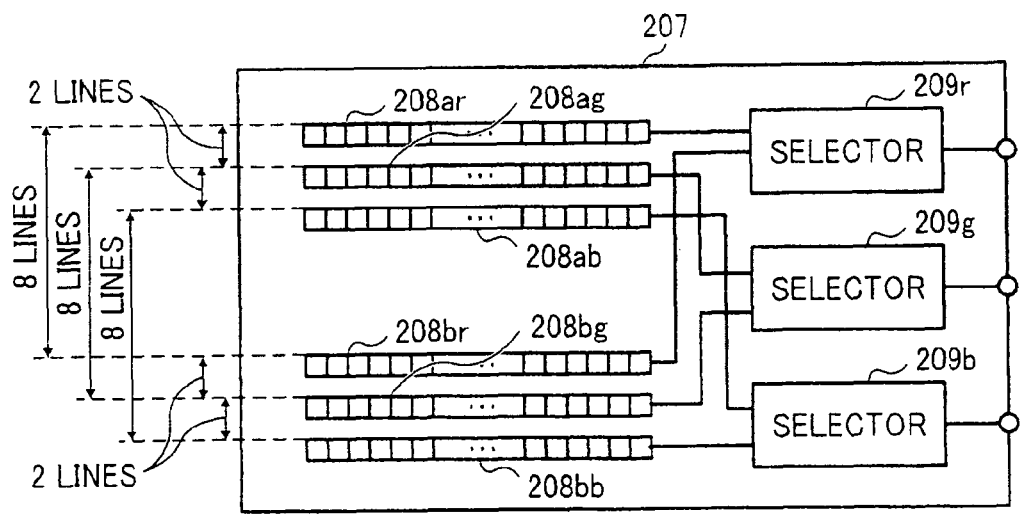
FIG. 6 is a schematic illustrating a structure when the CCD of FIG. 5 is used for a color original document.

FIG. 6 is a schematic illustrating a structural example when the CCD 207 of FIG. 5 is used for reading an image of a color original document. In the case of FIG. 6, line sensors 208$ar$ and 208$br$ for reading red-information, line sensors 208$ag$ and 208$bg$ for reading green-information, and line sensors 208$ab$ and 208$bb$ for reading blue-information are provided as line sensors for reading an image of a color original document. The line sensors 208$ar$ and 208$br$ are disposed at positions physically spaced apart from each other (by eight lines, herein). The same relationship is satisfied between the line sensors 208*ag* and 208*bg*, and between the line sensors 208*ab* and 208*bb*. A selector 209*r* selects a red-signal of either the line sensor 208*ar* or 208*br* to be output. Likewise, a selector 209*g* selects a green-signal of either the line sensor 208*ag* or 208*bg* to be output while a selector 209*b* selects a blue-signal of either the line sensor 208*ab* or 208*bb* to be output. This structure enables color image data at different positions of an original document in the sub-scanning direction to be obtained.

The following description is made when the CCD 207 of FIG. 5 is used unless otherwise noted. The application to the CCD 207 of FIG. 6 can be easily analogized by the following description.

Figure 7:
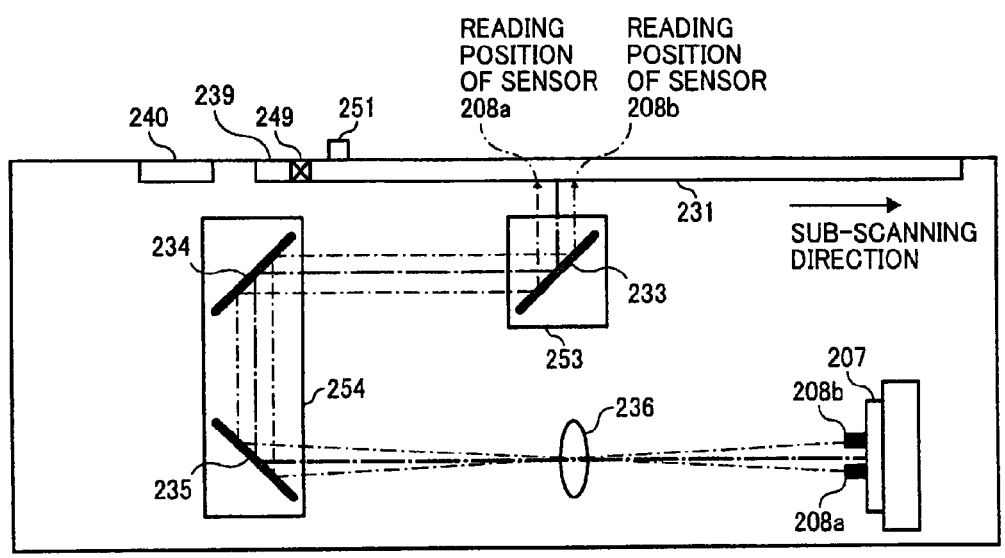
FIG. 7 is a schematic illustrating a reading position relationship of two line sensors of the CCD of FIG. 5 on the scanner.

FIG. 7 is a schematic illustrating a relationship between reading positions of the line sensors 208*a* and 208*b* of the CCD 207 of FIG. 5 on the scanner. In FIG. 7, the same elements as FIG. 2 are denoted with the same reference numerals. As illustrated in FIG. 7, the reading positions of the line sensors 208*a* and 208*b* of the CCD 207 are different from each other in relation to the position of the first carriage 253. In the embodiment, the reading position of the line sensor 208*b* is ahead of the reading position of the line sensor 208*a* by eight lines in the sub-scanning direction.

Figure 8:
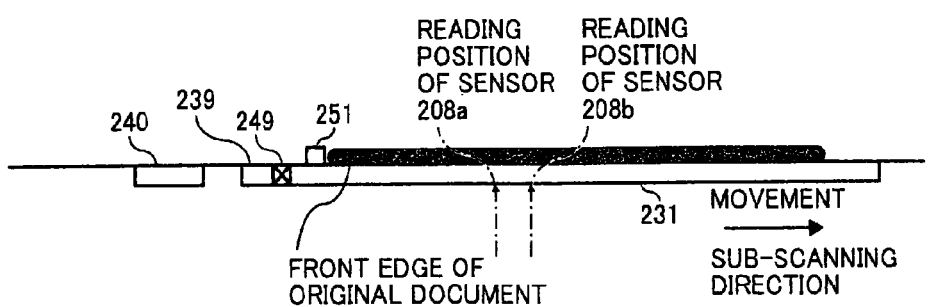
FIG. 8 is a schematic illustrating a relationship among the reading positions of the two line sensors of the CCD and an original document in flatbed reading.

FIG. 8 is a schematic illustrating a relationship among the reading positions of the line sensors 208*a* and 208*b*, and an original document when the original document is read by flatbed reading with a moving carriage. With the movement of the carriage from left to right in FIG. 8, the reading positions of the line sensors 208*a* and 208*b* move in the sub-scanning direction indicated in FIG. 8. In other words, with the movement of the carriage, the line sensors 208*a* and 208*b* read image lines of the original document at positions located apart from each other with a fixed distance on the original document. In the embodiment, when the line sensor 208*b* reads an image of a line lm of the original document, the line sensor 208*b* reads an image of a line lm−8 behind the line lm by eight lines. When the original document is read by ADF reading in which the original document is moved, the relationship is the opposite from that described above.

Specific examples of image reading stop operation according to the present invention are described in detail below on the basis that the reading positions of the line sensors 208*a* and 208*b* have the above-described relationship. The following description is made when an original document is read by flatbed reading with a moving carriage unless otherwise noted. The application to ADF reading in which the original document is moved can be easily analogized by the following description.

Specific Example 1

In most cases where an image is not normally read due to transitory electrical noises, the abnormality generally lasts for a time period equivalent to a few lines at longest, and it is rare that the abnormality extends to several dozens of lines. The specific example 1 assumes such case.

The operation outline of the specific example 1 is as follows. The carriage starts to move from the home position, and simultaneously the line sensor 208*b* starts to read an image of an original document (single mode). When an intermittent operation factor occurs, the line sensor 208*b* stops reading while the carriage continues to move. When the intermittent operation factor is eliminated before the reading position of the line sensor 208*a* reaches a reading stop position of the line sensor 208*b*, the line sensor 208*b* restarts reading. Thereafter, when the reading position of the line sensor 208*a* reaches the reading stop position of the line sensor 208*b*, the line sensors 208*a* and 208*b* alternately read an image of the original document on a line-by-line basis (dual mode) and continue the dual mode until the reading position of the line sensor 208*a* reaches a reading restart position of the line sensor 208*b*. In other words, an image that is not read by the line sensor 208*b* during reading stoppage is read by the line sensor 208*a*. When the reading position of the line sensor 208*a* reaches the reading restart position of the line sensor 208*b*, the line sensor 208*b* continues to read an image of the original document (single mode) again.

In contrast, when the intermittent operation factor is not eliminated even though the reading position of the line sensor 208*a* reaches the reading stoppage position of the line sensor 208*b*, the carriage stops moving. Thereafter, when the intermittent operation factor is eliminated, the carriage restart moving, and the line sensors 208*a* and 208*b* alternately read an image of the original document on a line-by-line basis (dual mode). Then, when the reading position of the line sensor 208*a* reaches the reading restart position of the line sensor 208*b*, the line sensor 208*b* continues to read an image of the original document (single mode) again.

According to the specific example 1, the number of times that the carriage stops moving and restarts moving can be reduced when an intermittent operation factor occurs. Particularly, when an image is not normally read due to an intermittent operation factor of transitory electrical noises, it is scarcely necessary to stop and restart carriage movement.

Figure 9:
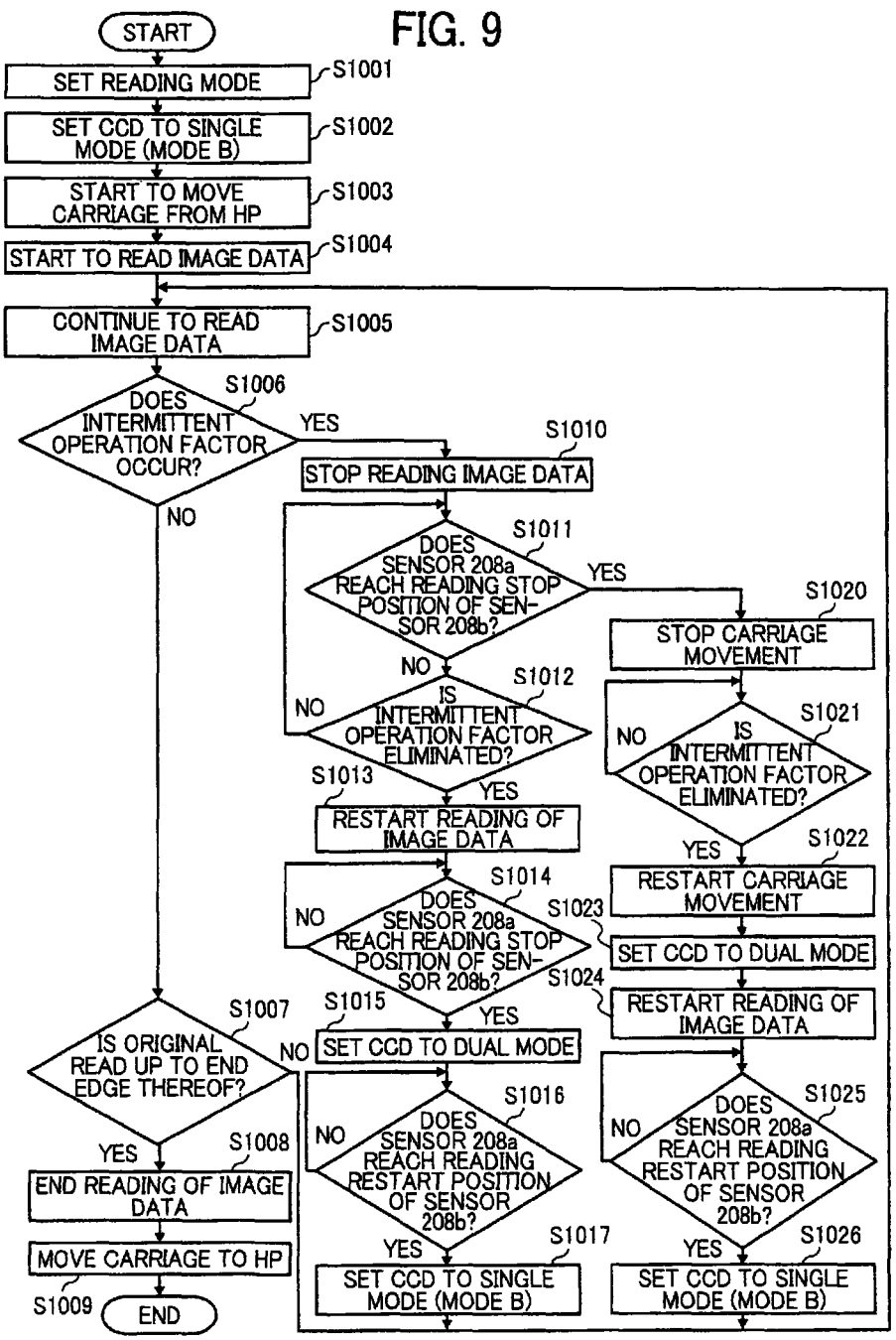
FIG. 9 is an overall flowchart illustrating flatbed reading operation of a specific example 1.

FIG. 9 is an overall flowchart illustrating flatbed reading operation of the example 1. The operation of the example 1 is described in detail based on FIG. 9 with reference to FIGS. 2, 4, and 5.

First, a user sets an original document on the exposure glass 231, selects an application (e.g., for copying, scanner, or FAX), and carries out necessary setting (e.g., image density, reading resolution, image quality mode, and magnification), and lastly carries out an original document reading start instruction (step S1001).

The CPU 216 sets, according to the instruction from the CPU 261, the operation mode of the CCD 207 to mode B in which a signal of the line sensor 208*b* is output as the single mode (step S1002). Based on the setting, the selector 209 of the CCD 207 switches to the line sensor 208*b* side so as to output image data read by the line sensor 208*b*. Then, the CPU 216 outputs, according to the instruction from the CPU 216, a PWM pulse to the motor driver 214. The motor driver 214 drives the running body motor 238 whereby the first carriage 253 starts to move from the home position (HP) (step S1003).

When the reading position of the line sensor 208*b* of the CCD 207 reaches the front edge of the original document after the first carriage 253 starts to move, the CPU 261 outputs a reading start signal to the scanner image processing unit 263. When receiving the signal, the scanner image processing unit 263 starts to take-in image data read by the line sensor 208*b* of the CCD 207 through the AFE 212 (step S1004).

With the movement of the first carriage 253, the line sensor 208*b* of the CCD 207 continues to read the original document while the scanner image processing unit 263 continues to take-in image data read by the line sensor 208*b* through the AFE 212 (step S1005).

The CPU 261 monitors whether any factors capable of inducing intermittent operation occur (step S1006). Examples of factors inducing intermittent operation include electrical noises and a case where an image is not normally read due to any cause.

If no intermittent operation factors occur, the CPU 261 monitors whether the reading position of the line sensor 208*b* of the CCD 207 reaches the rear end of the original document (step S1007). If the reading position of the line sensor 208b does not reach the rear edge of the original document, the flow returns to step S1005, in which the line sensor 208b continues to read an image. When the reading position of the line sensor 208b reaches the rear edge of the original document, the CPU 261 outputs a reading stop signal to the scanner image processing unit 263. When receiving the signal, the scanner image processing unit 263 ends taking-in of image data (step S1008). The CPU 216 stops outputting the PWM pulse to the motor driver 214 and changes the PWM pulse, according to the instruction from the CPU 261. After the CPU 216 stops outputting the PWM pulse, the motor driver 214 controls the running body motor 238 so that the first carriage 253 temporarily stops and thereafter returns to the home position (HP) (step S1009).

On the other hand, if the occurrence of an intermittent operation factor is confirmed at step S1006, the CPU 261 outputs a reading stop signal to the scanner image processing unit 263. When receiving the signal, the scanner image processing unit 263 stops taking-in image data (step S1010). Meanwhile, the first carriage 253 continues to move.

Thereafter, the CPU 261 monitors whether the reading position of the line sensor 208a of the CCD 207 reaches a reading stop position of the line sensor 208b (step S1011). If the reading position of the line sensor 208a does not reach the reading stop position of the line sensor 208b, the CPU 261 checks whether the intermittent operation factor is eliminated (step S1012). If the intermittent operation factor is not eliminated, the flow returns to step S1011. In other words, the CPU 261 monitors whether the intermittent operation factor is eliminated before the reading position of the line sensor 208a reaches the reading stop position of the line sensor 208b after the intermittent operation factor occurs and taking-in of image data is stopped (the carriage continues to move).

When the intermittent operation factor is eliminated before the reading position of the line sensor 208a of the CCD 207 reaches the reading stop position of the line sensor 208b, the CPU 261 outputs a reading restart signal to the scanner image processing unit 263. When receiving the signal, the scanner image processing unit 263 restarts taking-in of image data read by the line sensor 208b of the CCD 207 through the AFE 212 (step S1013).

Thereafter, the CPU 261 monitors whether the reading position of the line sensor 208a of the CCD 207 reaches the reading stop position of the line sensor 208b at step S1010 (step S1014). If the reading position of the line sensor 208a reaches the reading stop position of the line sensor 208b, the CPU 261 instructs the CPU 216 to set the operation mode of the CCD 207 to the dual mode in which signals of the line sensors 208a and 208b are alternately output on a line-by-line basis (step S1015). In response to the instruction, the selector 209 of the CCD 207 alternately switches signals from the line sensors 208a and 208b on a line-by-line basis. In other words, the CCD 207 outputs image data alternately read by the line sensors 208a and 208b on a line-by-line basis while the scanner image processing unit 263 takes in the image data through the AFE 212.

Thereafter, the CPU 261 monitors whether the reading position of the line sensor 208a of the CCD 207 reaches the reading restart position of the line sensor 208b at step S1013 (step S1016). If the reading position of the line sensor 208a reaches the reading restart position of the line sensor 208b, the CPU 261 instructs the CPU 216 to set the operation mode of the CCD 207 to mode B in which a signal of the line sensor 208b is output again as the single mode (step S1017). Based on the setting, the selector 209 of the CCD 207 switches to the line sensor 208b side so as to output image data read by the line sensor 208b from the CCD 207. The scanner image processing unit 263 takes in the image data through the AFE 212. Thereafter, the operation flow returns to step S1005.

In contrast, if the reading position of the line sensor 208a reaches the reading stop position of the line sensor 208b before the intermittent operation factor is eliminated, the CPU 261 instructs the CPU 216 to stop the first carriage 253 (step S1020). Specifically, the first carriage 253 is stopped and then moved in the returning direction. Then, the first carriage 253 is lastly stopped at a position where the reading position of the line sensor 208a is located slightly behind the reading stop position of the line sensor 208b. This manner is the same as Japanese Patent Application Laid-open No. 2001-024859. Thereafter, the CPU 261 continues to wait the elimination of the intermittent operation factor (step S1021).

If the intermittent operation factor is eliminated, the CPU 261 instructs the CPU 216 to restart the movement of the first carriage 253 (step S1022). The CPU 261 instructs the CPU 216 to set the operation mode of the CCD 207 to the dual mode in which signals of the line sensors 208a and 208b are alternately output on a line-by-line basis (step S1023). Then, the CPU 261 outputs the reading restart signal to the scanner image processing unit 263 so that the scanner image processing unit 263 restarts taking-in of image data (step S1024). Accordingly, the CCD 207 outputs image data alternately read by the line sensors 208a and 208b on a line-by-line basis while the scanner image processing unit 263 takes in the image data through the AFE 212.

The operation of steps S1025 and S1026 is the same as that of steps S1016 and S1017, and thus description thereof is omitted. Thereafter, the operation flow returns to step S1005.

As described later, image data of the original document can be made without missing data by combining pieces of image data read by the line sensors 208a and 208b.

The operation of steps S1010 to S1017 in the flowchart of FIG. 9 is described below in more detail. At steps S1010 to S1017, an intermittent operation factor occurs and is eliminated before the reading position of the line sensor 208a reaches the reading stop position of the line sensor 208b. This case is referred to as the example 1 below unless otherwise noted. The other case in which the reading position of the line sensor 208a reaches the reading stop position of the line sensor 208b before the intermittent operation factor is eliminated, i.e., the operation of steps S1020 to S1026 in the flowchart of FIG. 9, can be easily analogized by the following description, and thus, description thereof is omitted.

Figure 10:
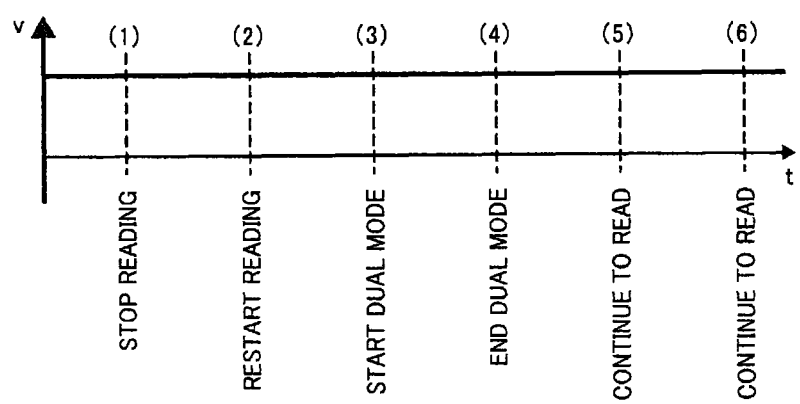
FIG. 10 is a schematic illustrating a moving speed of a carriage in the specific example 1.

FIG. 10 is a schematic illustrating a moving speed of the first carriage 253 of the specific example 1. In FIG. 10, the parenthetic numerals indicate time points as follows: (1) is a time point when the line sensor 208b of the CCD 207 stops reading an image; (2) is a time point when the line sensor 208b restarts reading an image (single mode); (3) is a time point when the CCD 207 starts the dual mode; (4) is a time point when the CCD ends the dual mode and the line sensor 208b starts to read an image again; and (5) and (6) are time points in a state in which an image is normally and continuously read.

As illustrated in FIG. 10, the moving speed of the first carriage 253 is constant even in the period of time in which reading of an image is stopped (reading stop period of an image), in the specific example 1. In other words, the first carriage 253 continues to move at a constant speed also in the reading stop period of an image. At time point (2) when reading restarts, the reading position of the line sensor 208b on the original document is ahead of the reading position of the line sensor 208b at time point (1) when reading stops.

Thus, the line sensor 208b cannot read an image of a region corresponding to from time point (1) to time point (2) on the original document. In the embodiment, the line sensor 208a reads an image of this region.

Figure 11:
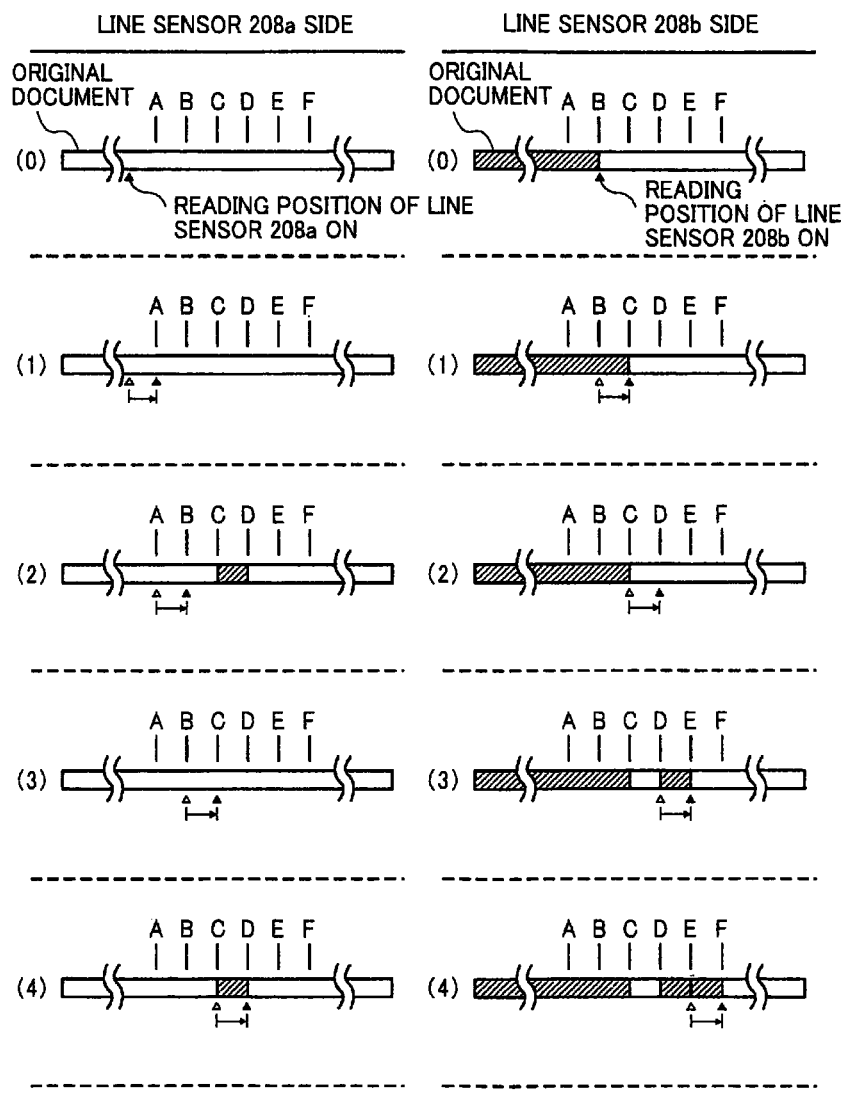
FIG. 11 is a schematic illustrating a specific relationship among the reading positions of two line sensors of the CCD and an original document at each time point in the specific example 1.

FIG. 11 is a schematic for specifically describing the positional relationship among the reading positions of the line sensors 208a and 208b of the CCD 207, and the original document at each time point of FIG. 10. It is assumed that the first carriage 253 moves from left to right in the same manner as FIG. 8. In FIG. 11, the left side part illustrates the reading positions of the line sensor 208a with respect to the original document while the right side part illustrates the reading positions of the line sensor 208b with respect to the original document. The hatched area on the original document is a region whose image has been read by the line sensor 208a or 208b. The original document is read from left to right with the movement of the first carriage 253. Accordingly, the line sensor 208b reads a region located ahead of the reading position of the line sensor 208a on the original document.

In FIG. 11, state (0) illustrates a time point when the reading position of the line sensor 208b on the original document reaches B after the first carriage 253 starts to move from left to right. The reading position of the line sensor 208a on the original document is located behind (by eight lines) from B. At the time point, the region from the front edge to B on the original document has been read by the line sensor 208b.

In FIG. 11, (1) to (4) illustrate the states of time point (1) to time point (4) of FIG. 10, respectively. State (1) to state (4) are described in detail below.

(1) When an intermittent operation factor occurs, the line sensor 208b stops reading an original document (step S1010 of FIG. 9). At the time point, the reading position of the line sensor 208b on the original document is C. In other words, reading of the original document stops at the time point when the original document has been read from the front edge to C. At the time point, the reading position of the line sensor 208a on the original document is A. The first carriage 253 continues to move at a constant speed even though reading of the original document stops as illustrated in FIG. 10.

(2) When the intermittent operation factor is eliminated, the line sensor 208b restarts reading the original document (step S1013 of FIG. 9). At the time point, the reading position of the line sensor 208b on the original document is D. In other words, the line sensor 208b restarts reading from D on the original document. At the time point, the reading position of the line sensor 208a on the original document is B.

(3) When the reading position of the line sensor 208a on the original document reaches C, i.e., reaches the reading stop position of the line sensor 208b on the original document, the operation mode of the CCD 207 is switched to the dual mode in which the line sensors 208a and 208b alternately read the original document on a line-by-line basis (step S1015 of FIG. 9). In other words, from the time point onward, the original document is alternately read by the line sensors 208a and 208b on a line-by-line basis.

At the time point when the reading position of the line sensor 208a on the original document reaches C, the reading position of the line sensor 208b reaches E. Accordingly, the region from D to E on the original document is read by the line sensor 208b.

(4) When the reading position of the line sensor 208a on the original document reaches D, i.e., reaches the reading resume position of the line sensor 208b, the dual mode ends in which the line sensors 208a and 208b alternately read the original document on a line-by-line basis. In other words, from the time point onward, the line sensor 208b alone reads the original document again (step S1017 of FIG. 9).

At the time point when the reading position of the line sensor 208a on the original document reaches D, the reading position of the line sensor 208b reaches F. In the dual mode, the line sensors 208a and 208b alternately read the original document on a line-by-line basis. For example, the line sensor 208a reads odd-number lines in the region from C to D on the original document while the line sensor 208b reads even-number lines in the region from E to F on the original document. In the region from F onward after the dual mode ends, reading of the original document is carried out by the line sensor 208b alone as normal reading.

As described above, the line sensor 208b skips the region from C to D on the original document in a period from (1) in which reading of an image stops to (2) in which reading of an image restarts. This skipped region is read by the line sensor 208a in a period from (3) to (4). Consequently, image data of the original document can be made without missing data by combining pieces of image data read by the line sensors 208a and 208b.

Figure 12:
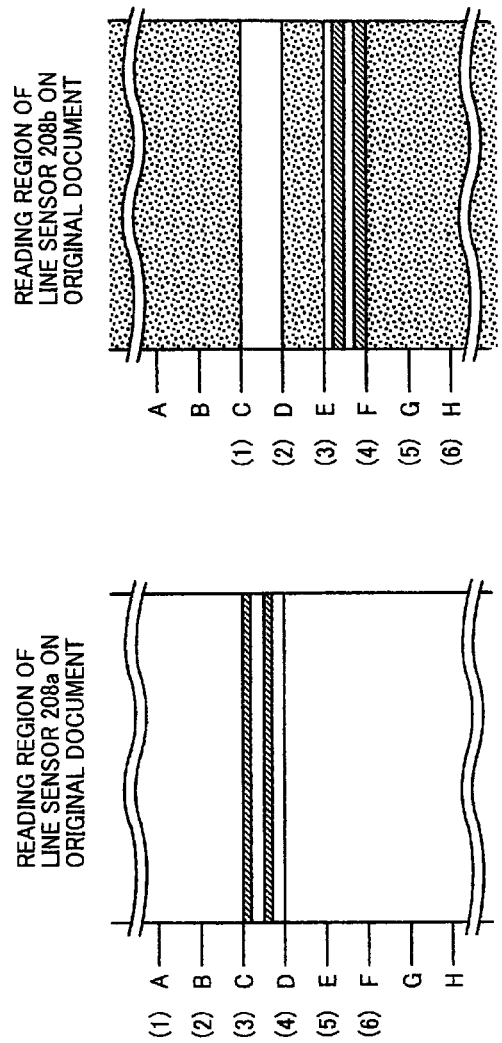
FIG. 12 is a schematic illustrating regions read by the two line sensors of the CCD on the original document in the specific example 1.

FIG. 12 is a schematic illustrating the regions read by the line sensors 208a and 208b of the CCD 207 on the original document in the specific example 1. In FIG. 12, the left side part illustrates the regions read by the line sensor 208a on the original document while the right side part illustrates the regions read by the line sensor 208b on the original document. In FIG. 12, (1) to (4), and A to F are the same as FIG. 11.

As illustrated in FIG. 12, the line sensor 208b reads the region from the front edge to C on the original document and the region from D onward while the line sensor 208a reads the region from C to D on the original document. Consequently, image data of the original document can be made without missing data by combining pieces of image data of the regions read by the line sensors 208a and 208b. This process is carried out by the image switching unit 310 included in the scanner image processing unit 263.

The resolution of image data read from the region from C to D by the line sensor 208a and from E to F by the line sensor 208b is reduced to half because reading of the original document by the line sensors 208a and 208b is alternated on a line-by-line basis. In FIG. 12, each of the region from C to D and the region from E to F includes four lines. The line sensor 208a reads odd-number lines in the region from C to D while the line sensor 208b reads even-number lines in the region from E to F. Of course, even-number lines may be read in the region from C to D while odd-number lines may be read in the region from E to F. Image quality of the regions from C to D and E to F can be improved by interpolation processing carried out by the image interpolation unit 330 included in the scanner image processing unit 263.

The operation of the CCD 207, and the image switching unit 310 and the image interpolation unit 330 that are included in the scanner image processing unit 263 in the specific example 1 is specifically described below based on FIGS. 10 to 12.

Figure 13:
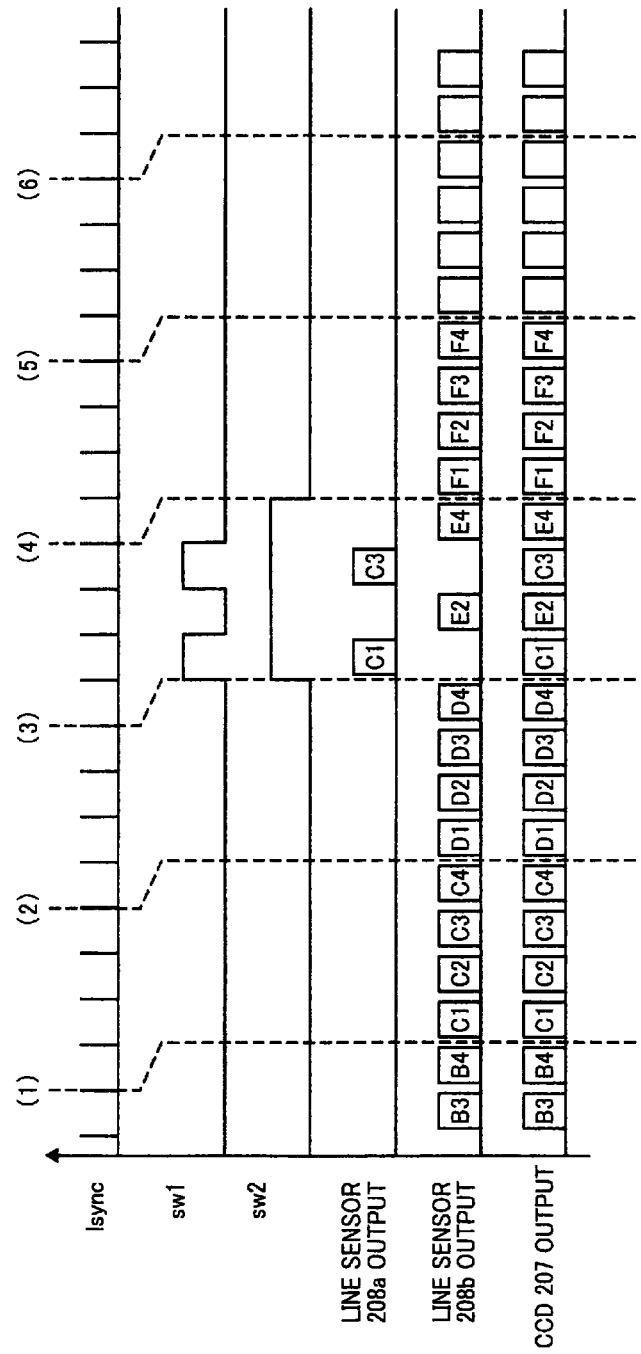
FIG. 13 is a schematic to describe specific operation of the CCD in the specific example 1.

FIG. 13 is a schematic illustrating the operation of the CCD 207 in the specific example 1. The input control signals of the CCD 207 include a signal lsync that defines a cycle of one line, and signals sw1 and sw2 that specify the operation mode. The signal sw1 selects the mode A or the mode B. The signal sw2 selects the dual mode or the other mode (the mode A or the mode B). The input control signals further include a pixel clock, a reset signal, and a clamp signal. The description thereof is omitted herein.

When the signal sw1 is set to "L" while the signal sw2 is set to "L", the CCD 207 operates with mode B and outputs image data read by the line sensor 208b alone. When the signal sw1 is set to "H" while the signal sw2 is set to "L", the CCD 207 operates with mode A and outputs image data read by the line sensor 208a alone. When the signal sw2 is set to "H", the CCD 207 operates with the dual mode. The CCD 207 alternately outputs image data read by the line sensors 208a and 208b on a line-by-line basis in accordance with the setting of the signal sw1, i.e., "L" or "H".

As described above, in the specific example 1, the CCD 207 operates with the dual mode in the period from (3) to (4) and alternately outputs image data read by the line sensors 208a and 208b on a line-by-line basis while the CCD 207 operates with mode B serving as the single mode in the other period and outputs image data read by the line sensor 208b alone. Here, mode A serving as the single mode is used in ADF reading in which an original document is moved.

In FIG. 13, one square represents image data of one line. For example, in the period from (1) to (3), the CCD 207 outputs image data C1 to C4 and D1 to D4 that is read by the line sensor 208b while, in the period from (4) to (5), the CCD 207 outputs image data F1 to F4 that is read by the line sensor 208b. In the period from (3) to (4), the CCD 207 alternately outputs image data C1 and C3 (from odd-number lines) read by the line sensor 208a and image data E2 and E4 (from even-number lines) read by the line sensor 208b. In this regard, image data C1 to C4 output from the CCD 207 is not taken in by the scanner image processing unit 263 provided at the latter stage of the CCD 207 because the period from (1) to (2) is the reading stop period.

Figure 14:
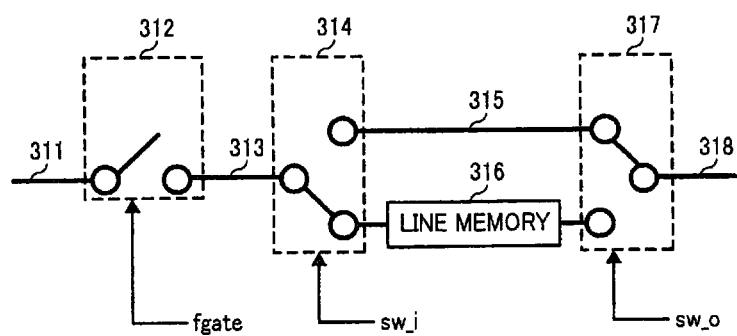
FIG. 14 is a schematic illustrating an exemplary structure of an image switching unit of a scanner image processing unit.

FIG. 14 is a schematic illustrating an exemplary structure of the image switching unit 310 of the scanner image processing unit 263. The image switching unit 310 includes an input line 311, an effective image switch 312, a path 313, an input switch 314, a pass-through path 315, a line memory 316, an output switch 317, and an output line 318. The line memory 316 is used for delaying output of image data by a line-interval (in the specific example 1, eight lines) between the line sensors 208a and 208b, and structured with, for example, an eight-stage shift register. The line memory 316 can delay output of image data read by the line sensor 208b until image data read by the line sensor 208a is output.

The input control signals of the image switching unit 310 include a signal fgate that sets ON and OFF operation of the effective image switch 312, a signal sw_i that switches the input switch 314 between the pass-through path 315 and the line memory 316, and a signal sw_o that switches the output switch 317 between the pass-through path 315 and the line memory 316. The input signals further include the signal lsync that defines the cycle of one line (not illustrated in FIG. 14). Image data in the line memory 316 is sequentially shifted from an input side to an output side with the signal lsync.

FIGS. 15A to 15D are schematics to describe the operation of the image switching unit 310. The operation of the image switching unit 310 switches according to the operation mode of the CCD 207.

Figure 15A:
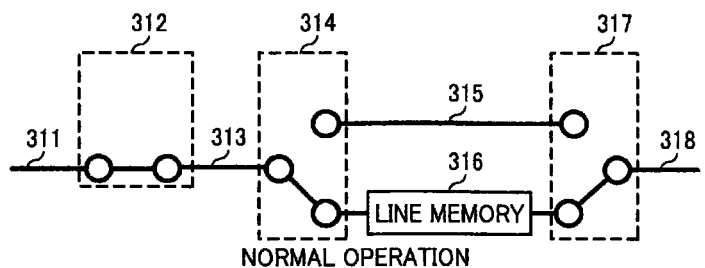
FIGS. 15A to 15D are schematics to describe specific operation of the image switching unit in the specific example 1.

FIG. 15A is the schematic to describe the operation of the image switching unit 310 in normal operation (the period until (1), the period from (2) to (3), and the period from (4) onward in FIG. 10). In the normal operation, image data read by the line sensor 208b of the CCD 207 is input to the image switching unit 310. In the image switching unit 310, the effective image switch 312 is set to ON, the input switch 314 is set to the line memory 316, and the output switch 317 is also set to the line memory 316. Accordingly, image data read by the line sensor 208b is sequentially input to the line memory 316 after passing through the input line 311, the effective image switch 312, the path 313, and the input switch 314. The image data input to the line memory 316 is sequentially output from the line memory 316 after being delayed by a predetermined line-interval (in the specific example 1, eight lines), so as to send to the output line 318 after passing through the output switch 317.

Figure 15B:
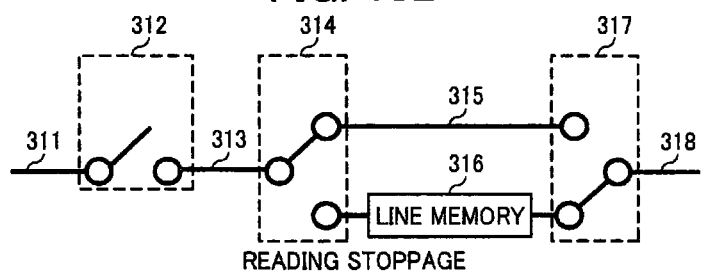

FIG. 15B is the schematic to describe the operation of the image switching unit 310 in reading stop (the period from (1) to (2) of FIG. 10). The CCD 207 outputs image data read by the line sensor 208b still during the reading stop (refer to FIG. 13). The image data output in the reading stop, however, is not normal, and needs to be prevented from being taken in by the scanner image processing unit 263. Because of this necessity, the effective image switch 312 is set to OFF in the image switching unit 310. The input switch 314 may be set to any of the pass-through path 315 and the line memory 316. In FIG. 15B, the input switch 314 is set to the pass-through path 315 for the sake of convenience. Because of this setting, image data read by the line sensor 208b of the CCD 207 is blocked by the effective image switch 312 and not input to the line memory 316. Meanwhile, the output switch 317 remains set to the line memory 316. Accordingly, image data having been input in the line memory 316 continues to be sequentially sent to the output line 318 after passing through the output switch 317. With the outputting of image data, the line memory 316 becomes empty sequentially from the input side.

Figure 15C:
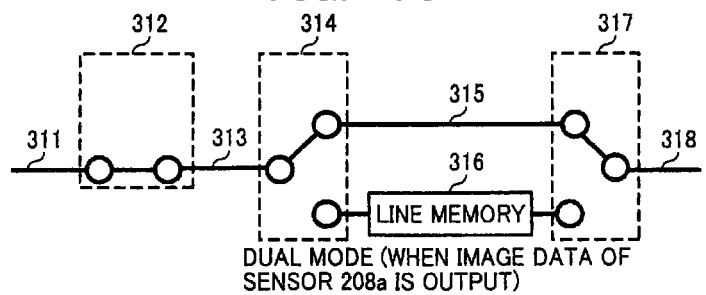
Figure 15D:
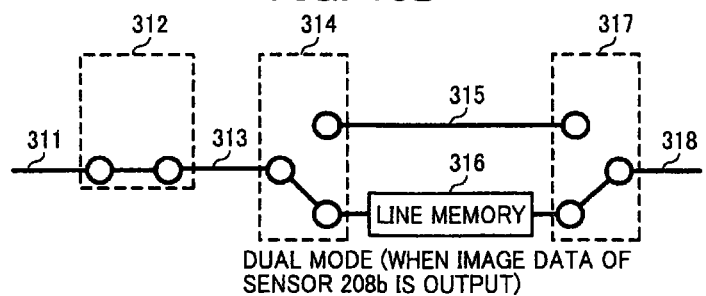

FIGS. 15C and 15D are the schematics to describe the operation of the image switching unit 310 in the dual mode operation (the period from (3) to (4) of FIG. 10). In the dual mode, the CCD 207 alternately outputs image data read by the line sensors 208a and 208b on a line-by-line basis. FIG. 15C illustrates a state of the image switching unit 310 when the CCD 207 outputs image data read by the line sensor 208a while FIG. 15D illustrates a state of the image switching unit 310 when the CCD 207 outputs image data read by the line sensor 208b. The states of FIGS. 15C and 15D are alternately switched on a line-by-line basis.

As illustrated in FIG. 15C, the effective image switch 312 is set to ON while the input switch 314 and the output switch 317 are set to the pass-through path 315 in the image switching unit 310 when the CCD 207 outputs image data read by the line sensor 208a. Accordingly, image data read by the line sensor 208a is directly sent to the output line 318 after passing through the input line 311, the effective image switch 312, the path 313, the input switch 314, the pass-through path 315, and the output switch 317.

In contrast, as illustrated in FIG. 15D, the effective image switch 312 remains set to ON while the input switch 314 and the output switch 317 are set to the line memory 316 in the image switching unit 310 when the CCD 207 outputs image data read by the line sensor 208b. In other words, this setting is the same as that in the normal operation of FIG. 15A. Accordingly, image data read by the line sensor 208b is input to the line memory 316 after passing through the input line 311, the effective image switch 312, the path 313, and the input switch 314. In other words, image data read by the line sensor 208b in the dual mode is sequentially input to the line memory 316 following image data read by the line sensor 208b after reading restarts. Then, image data read by the line sensor 208b in the dual mode is sent to the output line 318 after passing through the output switch 317 after being delayed by a predetermined line-interval (in the specific example 1, eight lines).

Figure 16:
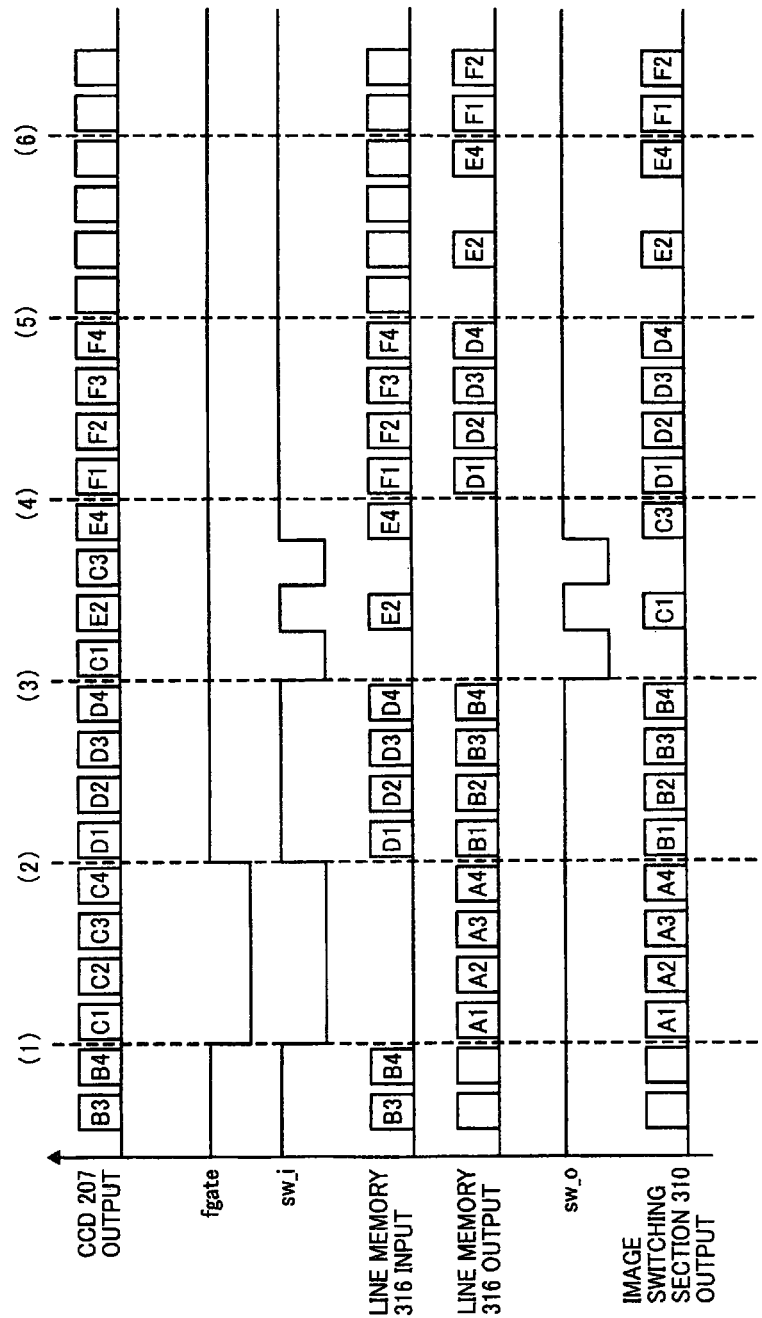
FIG. 16 is a schematic illustrating a relationship between the output of the CCD and the output of the image switching unit in the specific example 1.

FIG. 16 is a schematic illustrating the relationship between the output of the CCD 207 of FIG. 13 and the output of the image switching unit 310 together with the input and output of the line memory 316 and the control signals fgate, sw_i, and sw_o. As illustrated in FIGS. 15A to 15D, image data read by the line sensor 208b, excluding image date read in the reading stop period (the period from (1) to (2)), is sequentially input to the line memory 316 and sequentially output after being delayed by the interval of eight lines, in the output of the CCD 207. In contrast, image data C1 and C3 read by the line sensor 208a is directly output. Consequently, as illustrated in the lowest stage of FIG. 16, continuous image data of the original document is output from the image switching unit 310 as a result of combining pieces of image data read by the line sensors 208a and 208b.

Figure 17:
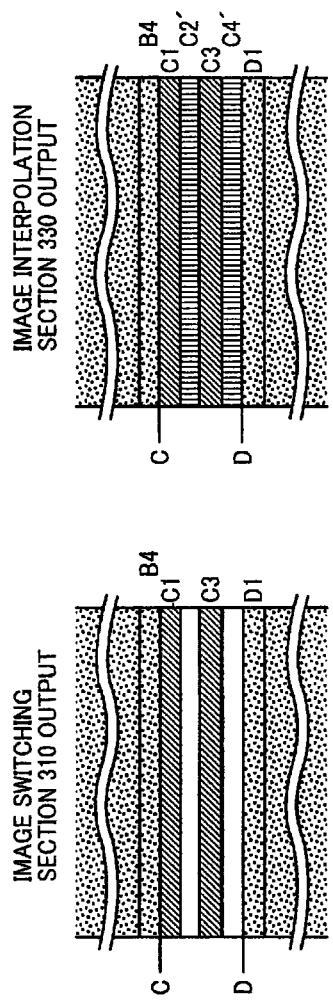
FIG. 17 is a schematic illustrating interpolation processing carried out by an image interpolation unit of the scanner image processing unit

FIG. 17 is a schematic illustrating interpolation processing carried out by the image interpolation unit 330 of the scanner image processing unit 263. As illustrated in FIG. 12, all necessary image data is not necessarily read from the regions from C to D by the line sensor 208a and from E to F by the line sensor 208b because reading of the original document by the line sensors 208a and 208b is alternated on a line-by-line basis. In the specific example 1, the line sensor 208a reads odd-number lines (C1 and C3) in the region from C to D while the line sensor 208b reads even-number lines (E2 and E4) in the region from E to F (e.g., FIGS. 13 and 16).

In order to address such a data structure, the image interpolation unit 330 receives image data output from the image switching unit 310, and carries out interpolation processing on the image data so as to produce image data interpolating missing data. Linear interpolation is used for interpolation processing, for example. An example of formulas of linear interpolation is represented by formula (1).

$$a'[n,m]=(a[n-1,m]+a[n+1,m])/2 \quad (1)$$

where a'[n, m] is image data to be produced: (n line, m-th pixel), a[n−1, m] is image data of a line located by one line before the image data to be produced: (n−1 line, m-th pixel), and a[n+1, m] is image data of a line located by one line after the image data to be produced: (n+1 line, m-th pixel). In other words, image data before and after the target line is averaged on a pixie-by-pixel basis to produce image data of the target line.

For example, as illustrated in FIG. 17, image data C2' is produced by interpolation processing with image data C1 and C2 while image data C4' is produced by interpolation processing with data C3 and D1, in the region from C to D. In the region from E to F (not illustrated in FIG. 17), image data E1' can be produced with image data D4 and E2 while image data E3' can be produced with image data E2 and E4.

Specific Example 2

In the specific example 1, the carriage continues to move during reading stoppage. In contrast, in a specific example 2, the carriage stops moving during reading stoppage. In addition, image data of an original document can be continuously formed without moving the carriage in the returning direction after the carriage stops as disclosed in Japanese Patent Application Laid-open No. 2001-024859. In the specific example 2, a case is assumed that a reading stop period is not predictable.

The operation outline of the specific example 2 is as follows. In the same manner as the specific example 1, the carriage starts to move from the home position, and simultaneously the line sensor 208b starts to read an image of an original document (single mode). When an intermittent operation factor occurs, the line sensor 208b stops reading and the carriage is decelerated and stopped. When the intermittent operation factor is eliminated, the carriage is accelerated. When the carriage reaches a constant speed, the line sensor 208b restarts reading. Thereafter, when the reading position of the line sensor 208a reaches the reading stop position of the line sensor 208b, the line sensors 208a and 208b alternately read an image of the original document on a line-by-line basis (dual mode) and continue the dual mode until the reading position of the line sensor 208a reaches the reading restart position of the line sensor 208b. In other words, the line sensor 208a reads an image of the original document in a period in which the line sensor 208b does not read the original document. The period is from the reading stop time point until the time point when the carriage reaches the constant speed after the carriage is decelerated, stopped and thereafter accelerated. When the reading position of the line sensor 208a reaches the reading restart position of the line sensor 208b, the line sensor 208b continues to read an image of the original document again (single mode).

According to the specific example 2, a case can be managed in which the period of reading stop is completely unpredictable because the period lasts randomly. In addition, it is not necessary that the carriage is moved in the returning direction every time reading is stopped.

Figure 18:
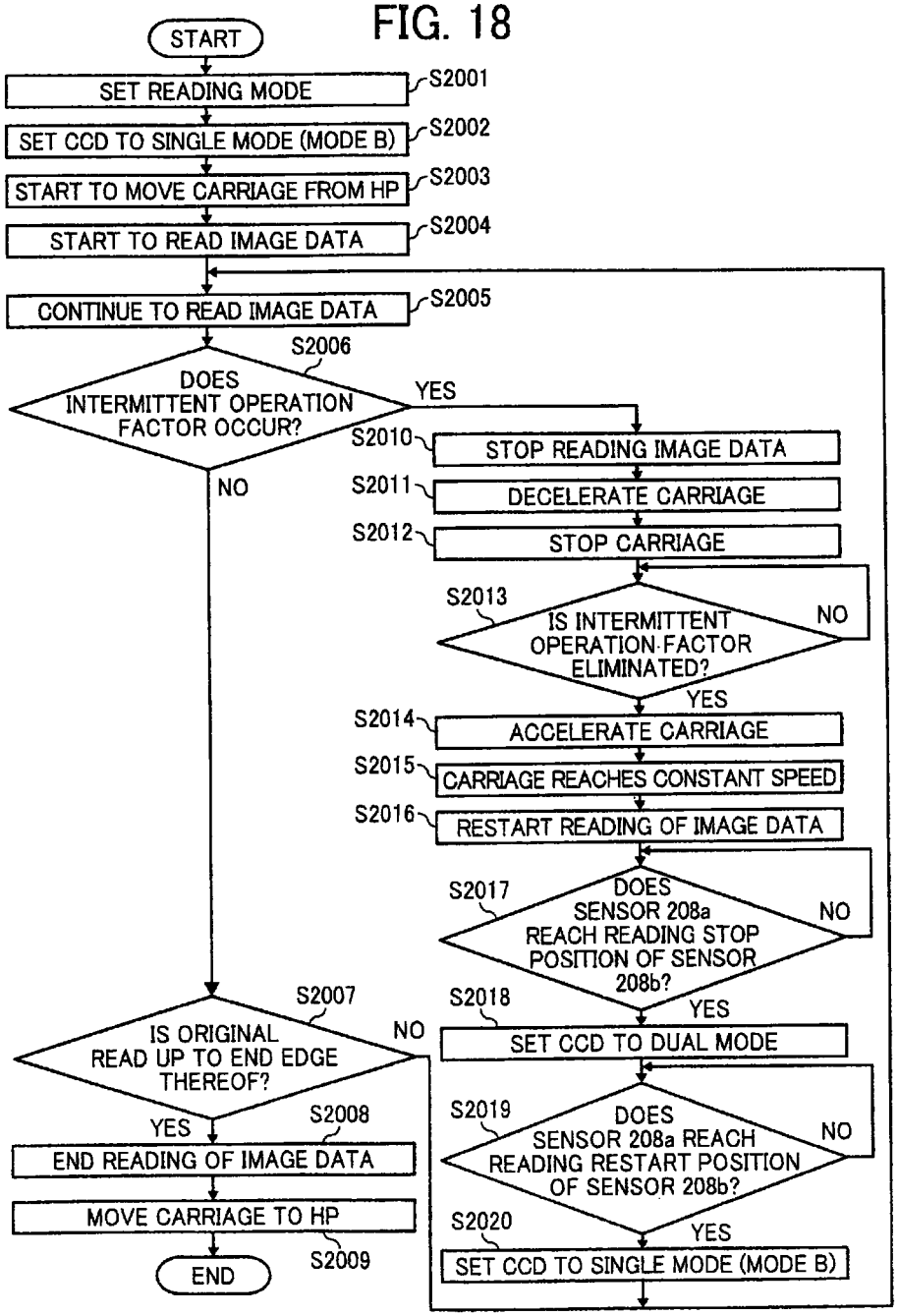
FIG. 18 is an overall flowchart illustrating flatbed reading operation of a specific example 2.

FIG. 18 is an overall flowchart illustrating flatbed reading operation of the specific example 2. The operation of the specific example 2 is described in detail based on FIG. 18 with reference to FIGS. 4 and 5. The operation from steps S2001 to S2009 is the same as that from steps S1001 to S1009 of FIG. 9, and the description thereof is omitted.

If the occurrence of an intermittent operation factor is confirmed (YES at step S2006), the CPU 261 outputs a read stop signal to the scanner image processing unit 263. When receiving the signal, the scanner image processing unit 263 stops taking-in image data read by the line sensor 208b (step S2010). The CPU 261 instructs the CPU 216 to gradually decelerate the first carriage 253 so that the first carriage 253 stops (steps S2011 and S2012). Specifically, the CPU 216 gradually increases the PWM pulse generation cycle for controlling the running body motor 238 based on the instruction from the CPU 261. As the pulse generation cycle increases, the first carriage 253 gradually decelerates. Lastly, the CPU 216 stops outputting the PWM pulse for controlling the running body motor 238. Accordingly, the first carriage 253 stops. As a result, the first carriage 253 stops at a position located slightly ahead of the reading stop position on the original document.

The CPU 261 watches whether the intermittent operation factor is eliminated (step S2013). If the intermittent operation factor is eliminated, the CPU 261 instructs the CPU 216 to gradually accelerate the first carriage 253 so as to reach a constant speed (steps S2014 and S2015). Specifically, the CPU 216 produces again the PWM pulse for controlling the running body motor 238 and gradually decrease the pulse generation cycle, based on the instruction from the CPU 261. As the pulse generation cycle decreases, the first carriage 253 gradually accelerates. Lastly, the CPU 216 decreases the PWM pulse generation cycle for controlling the running body motor 238 to the same cycle as before the occurrence of the intermittent operation factor. Accordingly, the first carriage 253 reaches the same speed (constant speed) as before the occurrence of the intermittent operation factor.

The CPU 261 outputs a reading restart signal to the scanner image processing unit 263 at the time point when the first carriage 253 reaches a constant speed after the elimination of the intermittent operation factor. When receiving the signal, the scanner image processing unit 263 restarts taking-in image data read by the line sensor 208b (step S2016).

Thereafter, the CPU 261 monitors whether the reading position of the line sensor 208a of the CCD 207 reaches the reading stop position of the line sensor 208b at step S2010 (step S2017). If the reading position of the line sensor 208a reaches the reading stop position of the line sensor 208b, the CPU 261 instructs the CPU 216 to set the operation mode of the CCD 207 to the dual mode in which signals of the line sensors 208a and 208b are alternately output on a line-by-line basis (step S2018). In response to the instruction, the selector 209 of the CCD 207 alternately switches signals from the line sensors 208a and 208b on a line-by-line basis. In other words, the CCD 207 outputs image data alternately read by the line sensors 208a and 208b on a line-by-line basis while the scanner image processing unit 263 takes in the image data through the AFE 212.

Thereafter, the CPU 261 monitors whether the reading position of the line sensor 208a of the CCD 207 reaches the reading restart position of the line sensor 208b at step S2016 (step S2019). If the reading position of the line sensor 208a reaches the reading restart position of the line sensor 208b, the CPU 261 instructs the CPU 216 to set the operation mode of the CCD 207 to mode B in which the line sensor 208b outputs a signal as the single mode again (step S2020). Based on the setting, the selector 209 of the CCD 207 switches to the line sensor 208b side so as to output image data read by the line sensor 208b again from the CCD 207. The scanner image processing unit 263 takes in the image data through the AFE 212. Thereafter, the operation flow returns to step S2005.

In the specific example 2, the line sensor 208b skips the region, on the original document, from the reading stop position to the point at which the carriage reaches a constant speed after the carriage is decelerated, stopped and accelerated. However, the line sensor 208a can read the region. Consequently, image data of the original document can be made without missing data by combining pieces of image data read by the line sensors 208a and 208b in the same manner as the specific example 1.

Figure 19:
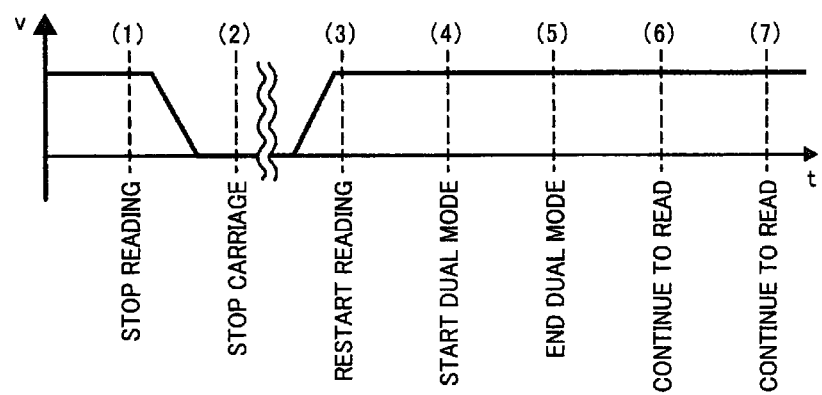
FIG. 19 is a schematic illustrating a moving speed of a carriage in the specific example 2.

FIG. 19 is a schematic illustrating a moving speed of the first carriage 253 of the specific example 2. In FIG. 19, the parenthetic numerals indicate time points as follows: (1) is a time point when the line sensor 208b of the CCD 207 stops reading an image; (2) is a time point in a state in which the first carriage 253 stops; (3) is a time point when the line sensor 208b restarts reading an image; (4) is a time point when the dual mode starts in which the line sensors 208a and 208b of the CCD 207 alternately read an image on a line-by-line basis; (5) is a time point when the dual mode ends and the line sensor 208b starts to read an image again; and (6) and (7) are time points in a state in which the line sensor 208b continues to normally read images.

As illustrated in FIG. 19, in the specific example 2, a period in which the first carriage 253 decelerates, stops, and accelerates occurs between reading stoppage and reading restarting. Because of the period, the reading position of the line sensor 208b on the original document at time point (3) that is the reading restarting time point is ahead of the reading position of the line sensor 208b on the original document at time point (1) that is the reading stoppage time point. The line sensor 208b, thus, cannot read an image of the original document in the region corresponding to from time point (1) to time point (3). In the embodiment, the line sensor 208a reads an image of this region.

Figure 20:
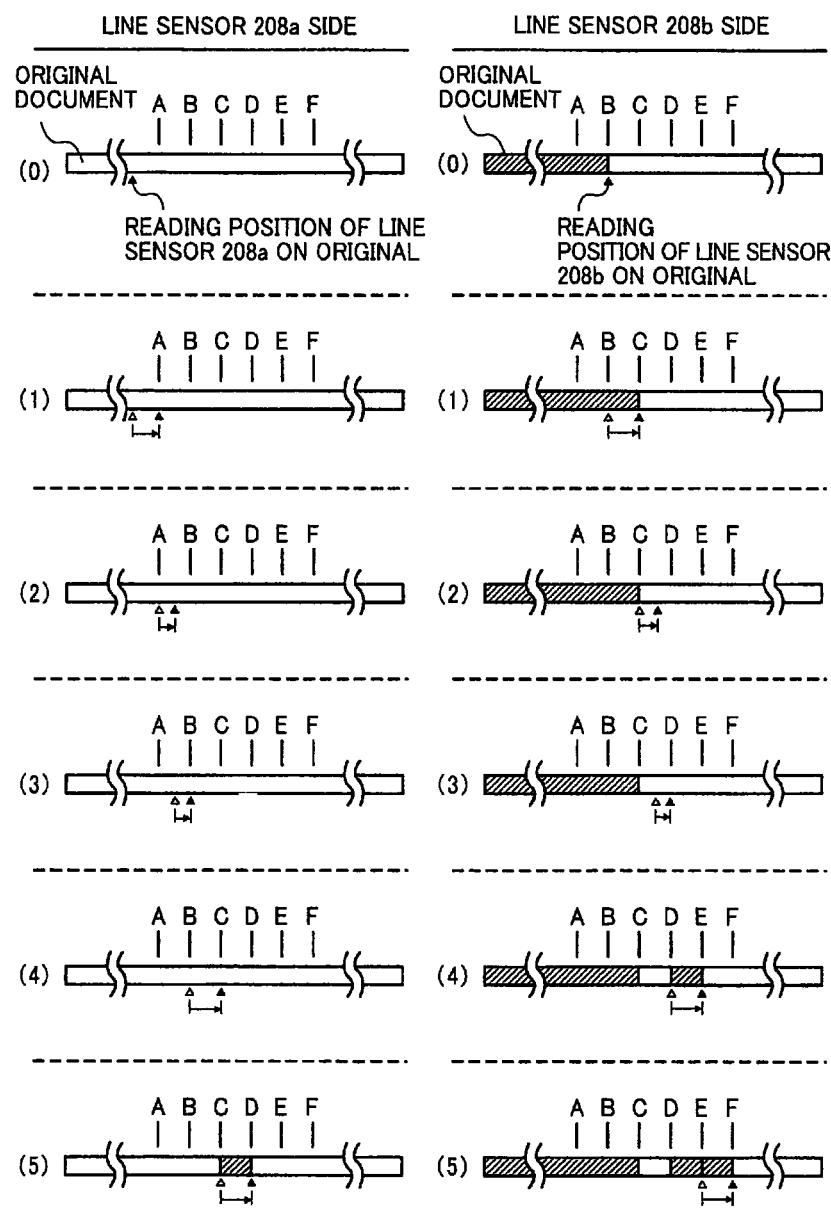
FIG. 20 is a schematic illustrating a specific relationship among the reading positions of two line sensors of a CCD and an original document at each time point in the specific example 2.

FIG. 20 is a schematic for specifically describing the positional relationship among the reading positions of the line sensors 208a and 208b of the CCD 207 and the original document at each time point of FIG. 19. In FIG. 20, the left side part illustrates the reading positions of the line sensor 208a with respect to the original document while the right side part illustrates the reading positions of the line sensor 208b with respect to the original document. It is assumed that the first carriage 253 moves from left to right, herein. The hatched area on the original document represents a region whose image has been read by the line sensor 208a or 208b. The original document is read from left to right with the movement of the first carriage 253. Accordingly, the line sensor 208b reads a region located ahead of the reading position of the line sensor 208a on the original document.

In FIG. 20, (0) illustrates a time point when the reading position of the line sensor 208b on the original document reaches B after the first carriage 253 starts to move from left to right. The reading position of the line sensor 208a on the original document is located behind (by eight lines) from B. At the time point, the region from the front edge to B on the original document has been read by the line sensor 208b.

In FIG. 20, (1) to (5) illustrate the states of time point (1) to time point (5) of FIG. 19, respectively. State (1) to state (5) are described in detail below.

(1) When an intermittent operation factor occurs, the line sensor 208b stops reading an original document (step S2010 of FIG. 18). At the time point, the reading position of the line sensor 208b on the original document is C. In other words, reading of the original document stops at the time point when the original document has been read from the front edge to C by the line sensor 208b. At the time point, the reading position of the line sensor 208a on the original document is A. Once the reading of the original document stops, the first carriage 253 starts to decelerate (step S2011 of FIG. 18).

(2) The first carriage 253 stops after the deceleration (step S2012 of FIG. 18). At the time, the reading position of the line sensor 208b on the original document is located slightly ahead of C. Likewise, the reading position of the line sensor 208a on the original document is located slightly ahead of A.

(3) When the intermittent operation factor is eliminated, the first carriage 253 starts to accelerate (step S2014 of FIG. 18). When the moving speed of the first carriage 253 reaches a constant speed (step S2015 of FIG. 18), the line sensor 208b restarts reading the original document (step S2016 of FIG. 18). At the time point, the reading position of the line sensor 208b on the original document is D. In other words, the line sensor 208b restarts reading from D on the original document. At the time point, the reading position of the line sensor 208a on the original document is B.

(4) When the reading position of the line sensor 208a on the original document reaches C, i.e., reaches the reading stop position of the line sensor 208b on the original document, the operation mode of the CCD 207 is switched to the dual mode in which the line sensors 208a and 208b alternately read the original document on a line-by-line basis (step S2018 of FIG. 18). In other words, from the time point onward, the original document is alternately read by the line sensors 208a and 208b on a line-by-line basis.

At the time point when the reading position of the line sensor 208a on the original document reaches C, the reading position of the line sensor 208b reaches E. Accordingly, the region from D to E on the original document is read by the line sensor 208b.

(5) When the reading position of the line sensor 208a on the original document reaches D, i.e., reaches the reading resume position of the line sensor 208b, the dual mode ends in which the line sensors 208a and 208b alternately read the original document on a line-by-line basis. In other words, from the time point onward, the line sensor 208b alone reads the original document again (step S2020 of FIG. 18).

At the time point when the reading position of the line sensor 208a on the original document reaches D, the reading position of the line sensor 208b reaches F. In the dual mode, the line sensors 208a and 208b alternately read the original document on a line-by-line basis. For example, the line sensor 208a reads odd-number lines in the region from C to D on the original document while the line sensor 208b reads even-number lines in the region from E to F on the original document. In the region from F onward after the dual mode ends, the reading of the original document is carried out by the line sensor 208b alone as normal reading.

In the specific example 2, the line sensor 208b skips the region from C to D on the original document in a period from (1) to (3), which is from the time reading of an image stops and until the time it restarts. This skipped region is read by the line sensor 208a in a period from (4) to (5). Consequently, image data of the original document can be made without missing data by combining pieces of image data read by the line sensors 208a and 208b.

Figure 21:
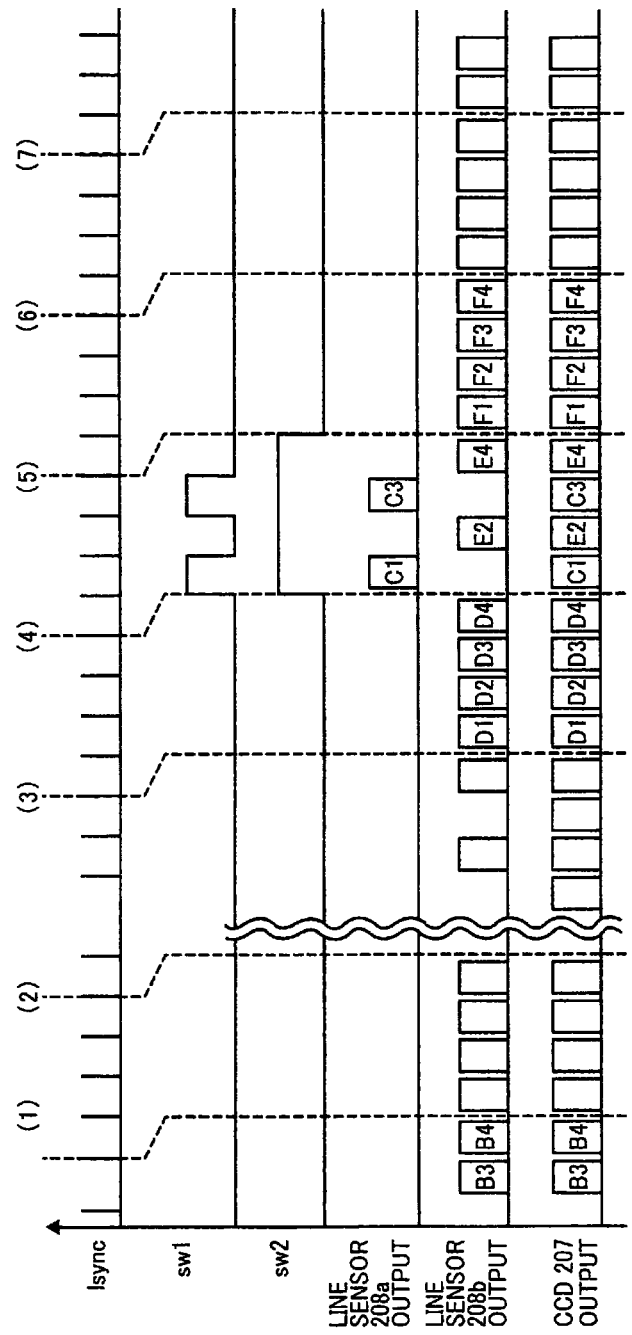
FIG. 21 is a schematic to describe specific operation of the CCD in the specific example 2.

FIG. 21 is a schematic illustrating the operation of the CCD 207 in the specific example 2. Here, the control signals lsync, sw1, and sw2 are the signals illustrated in FIG. 13.

In the specific example 2, the CCD 207 outputs no image data during the reading stop period from (1) to (3). The CCD 207 outputs image data read by the line sensor 208b in the period from reading start to (1), the period from (3) to (4), and the period from (5) onward. The CCD 207 operates with the dual mode and alternately outputs image data read by the line sensors 208a and 208b in the period from (4) to (5). Consequently, the CCD 207 outputs image data illustrated in the lowest stage of FIG. 21.

In the same manner as FIG. 13, one square represents image data of one line in FIG. 21. For example, in the period from (3) to (4), the CCD 207 outputs image data C1 to C4 that is read by the line sensor 208b while, in the period from (5) to (6), the CCD 207 outputs image data F1 to F4 that is also read by the line sensor 208b. In the period from (4) to (5), the CCD 207 alternately outputs image data C1 and C3 (from odd-number lines) read by the line sensor 208a and image data E2 and E4 (from even-number lines) read by the line sensor 208b.

The image switching unit 310 of the scanner image processing unit 263 takes in output image data of the CCD 207 through the AFE 212, and sorts pieces of image data read by the line sensor 208a so as to output image data of the original document without missing data from the front edge of the original document. The structure and operation of the image switching unit 310 are the same as those illustrated in FIGS. 14 and 15A to 15D, and the description thereof is omitted.

Figure 22:
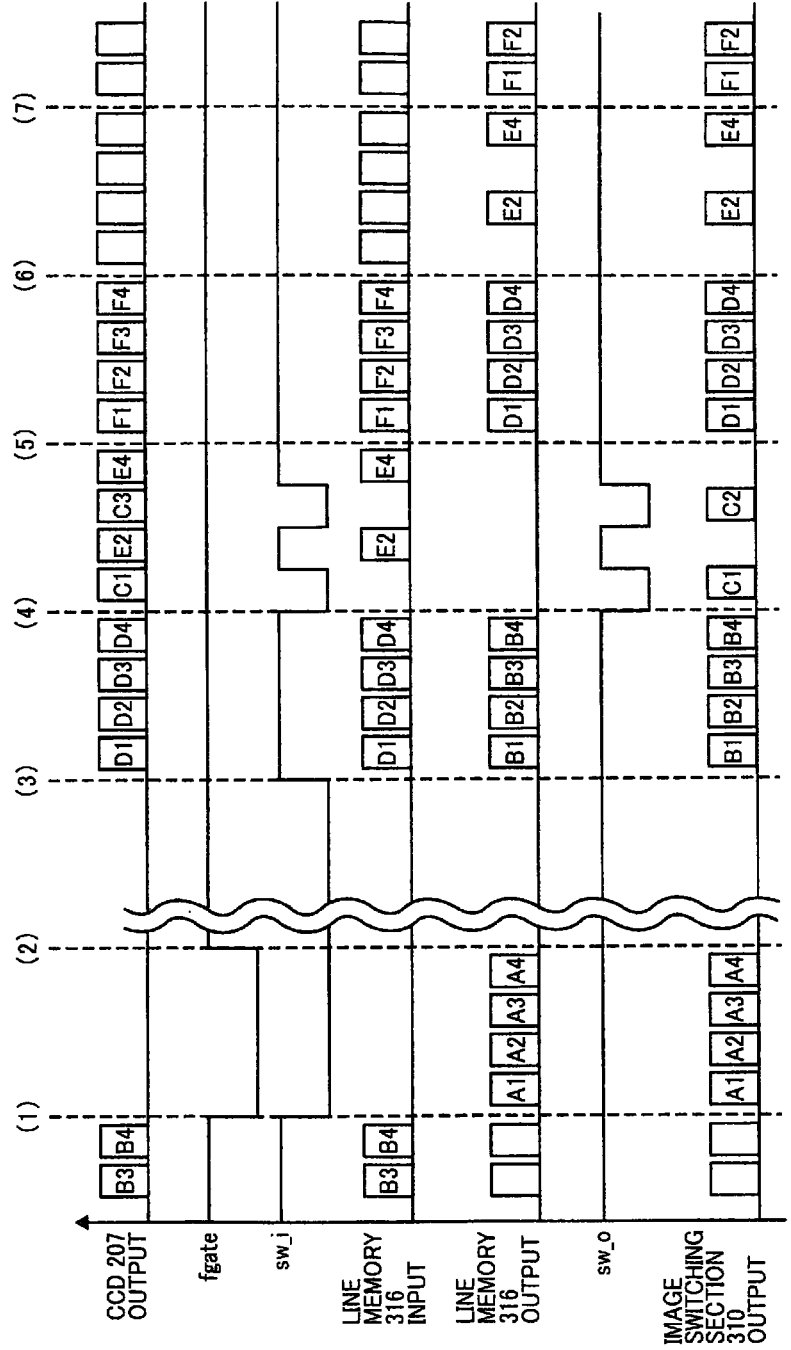
FIG. 22 is a schematic illustrating a relationship between the output of the CCD and the output of the image switching unit in the specific example 2.

FIG. 22 is a schematic illustrating the relationship between the output of the CCD 207 of FIG. 21 and the output of the image switching unit 310 together with the input and output of the line memory 316 and the control signals fgate, sw_i, and sw_o. As illustrated in FIGS. 15A to 15D, image data read by the line sensor 208b is sequentially input to the line memory 316 and sequentially output after being delayed by the interval of eight lines, in the output of the CCD 207. In contrast, image data (C1 and C3) read by the line sensor 208a is directly output. Consequently, as illustrated in the lowest stage of FIG. 22, continuous image data of the original document is output without missing data from the image switching unit 310 as a result of combining pieces of image data read by the line sensors 208a and 208b.

Image data output from the image switching unit 310 is subjected to necessary interpolation processing carried out by the image interpolation unit 330 of the scanner image processing unit 263. The interpolation processing is the same as the specific example 1 (refer to FIG. 17), and the description thereof is omitted.

Specific Example 3

A specific example 3 is a modification of the specific example 1. The specific example 3 utilizes the operation of the specific example 2 when the first carriage 253 stops and restarts moving. In the specific example 1, if an intermittent operation factor is not eliminated when the reading position of the line sensor 208a reaches the reading stop position of the line sensor 208b after the occurrence of the intermittent operation factor and the line sensor 208b stops reading, the first carriage 253 stops moving. Thereafter, the first carriage 253 needs to move in the returning direction as disclosed in Japanese Patent Application Laid-open No. 2001-024859. In the specific example 3, the first carriage 253 does not need to move in the returning direction after the first carriage 253 stops moving by utilizing the operation of the specific example 2.

Figure 23:
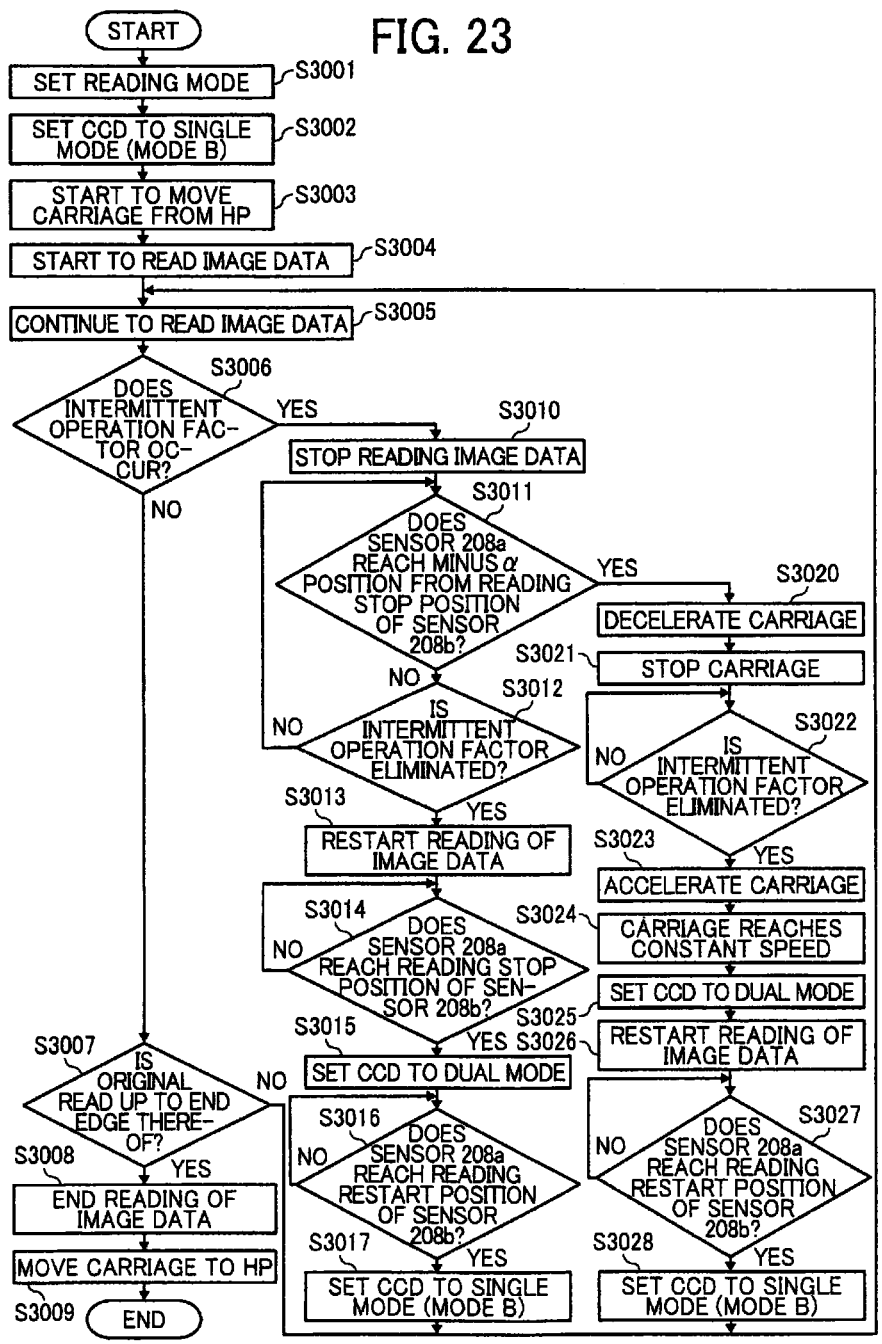
FIG. 23 is an overall flowchart illustrating flatbed reading operation of a specific example 3.

FIG. 23 is an overall flowchart illustrating flatbed reading operation of the specific example 3. The overall operation is basically the same as FIG. 9. The operation different from that of FIG. 9 is described below.

The CPU 261 monitors whether the reading position of the line sensor 208a reaches a position located ahead of the reading stop position of the line sensor 208b by a (hereinafter the position is referred to as a minus a position from the reading stop position) after the intermittent operation factor occurs and the line sensor 208b stops reading and before the intermittent operation factor is eliminated (step S3011). Here, the value of a corresponds to a moving distance that the first carriage 253 moves in the period in which the first carriage 253 decelerates and stops, and thereafter accelerates and reaches a constant speed. The value is measured in advance by practically driving the first carriage 253, for example.

If the reading position of the line sensor 208a reaches the minus a position from the reading stop position of the line sensor 208b before the intermittent operation factor is eliminated, the CPU 261 instructs the CPU 216 to gradually decelerate the first carriage 253 so that the first carriage 253 stops (steps S3020 and S3021). Thereafter, the CPU continues to wait the elimination of the intermittent operation factor (step S3022).

If the intermittent operation factor is eliminated, the CPU 261 instructs the CPU 216 to gradually accelerate the first carriage 253 so as to reach a constant speed (steps S3023 and S3024). When the first carriage 253 reaches the constant speed, the line sensor 208a just reaches the reading stop position of the line sensor 208b. In other words, the value of a is set so as to satisfy such positional relationship.

The CPU 261 instructs the CPU 216 to set the operation mode of the CCD 207 to the dual mode when the first carriage 253 reaches the constant speed, i.e., when the line sensor 208a reaches the reading stop position of the line sensor 208b (step S3025). The CPU 261 outputs the reading restart signal to the scanner image processing unit 263 so that the scanner image processing unit 263 restarts taking in image data from the CCD 207 (step S3026). The operation from step S3026 onward is exactly the same as the specific example 1.

The operation of deceleration, stoppage, acceleration, and constant speed is the same as that of the specific example 2, and the detailed description thereof is omitted.

Specific Example 4

In some cases, the reading positions of the line sensors 208a and 208b of the CCD 207 are slightly different from each other in the main-scanning direction. When continuous image data of an original document is made by combining pieces of image data read by the line sensors 208a and 208b, discrepancy in the main-scanning direction also occurs. In the specific example 4, such discrepancy is corrected.

Figure 24:
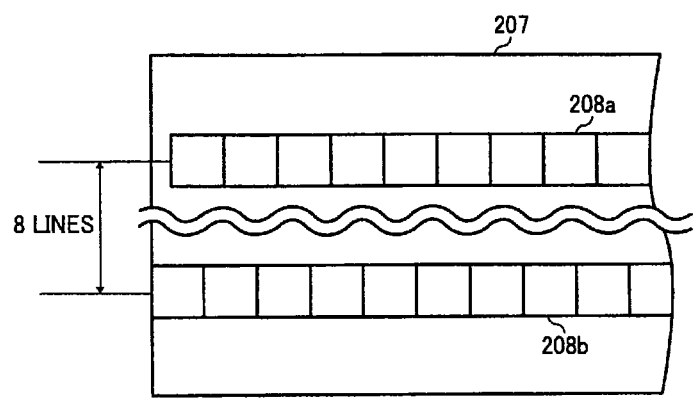
FIG. 24 is a schematic illustrating a structure when a pixel-shift is caused between the two line sensors of the CCD in a main-scanning direction.

FIG. 24 is a schematic illustrating an example of an arrangement of the line sensors 208a and 208b of the CCD 207. In FIG. 24, the line sensors 208a and 208b are arranged shifted from each other by a half-pixel (½ pixel) in the main-scanning direction. When two pieces of image data read by the line sensors 208a and 208b that are arranged shifted are directly combined, a half-pixel shift occurs in the main-scanning direction in the same manner as the shifted arrangement. In the specific example 4, for example, pixels of image data read by the line sensor 208a are shifted to one side in the main-scanning direction by the half-pixel so as to align the image data read by the line sensor 208a with image data read by image data read by the line sensor 208b. Of course, the pixel shift may be smaller than ½ pixel.

Figure 25:
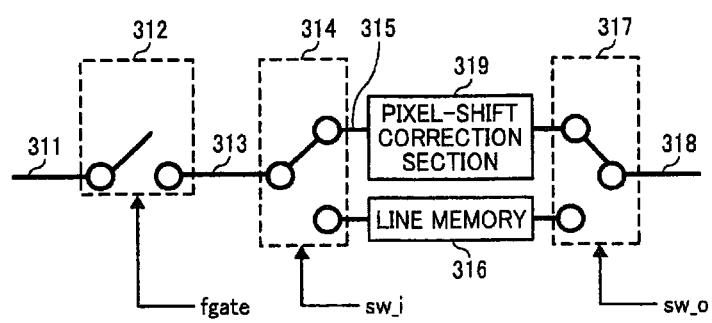
FIG. 25 is a schematic illustrating an exemplary structure of the image switching unit including a pixel-shift correction section.

FIG. 25 is a schematic illustrating a structure of the image switching unit 310 including a pixel-shift correction unit in the specific example 4. In FIG. 25, a pixel-shift correction section 319 is disposed in the pass-through path 315. The structure of the image switching unit 310 excluding the pixel-shift correction section 319 is the same as that of FIG. 14.

As described in the specific examples 1 and 2, image data read by the line sensor 208a is sent to the output line 318 after passing though the input line 311, the effective image switch 312, the path 313, the input switch 314, the pass-through path 315, and the output switch 317 when the CCD 207 operates with the dual mode. In this data flow, the pixel-shift correction section 319 shifts the pixels of image data read by the line sensor 208a to one side in the main-scanning direction by the half-pixel (a pixel-shift) so as to align the image data read by the line sensor 208a with the image data read by the line sensor 208b.

Figure 26:
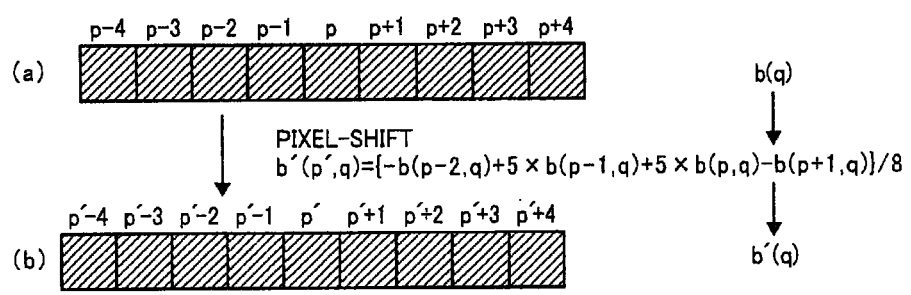
FIG. 26 is a schematic to describe operation of the pixel-shift correction section.

FIG. 26 is a schematic to describe pixel-shift processing carried out by the pixel-shift correction section 319. A section (a) in FIG. 26 shows image data read by the line sensor 208a before pixel-shift processing while a section (b) in FIG. 26 shows the image data read by the line sensor 208a after pixel-shift processing.

The pixel-shift correction section 319 outputs image data b'(p', q) obtained by calculation with formula (2) when image data b(p, q) is input:

$$b'(p',q)=\{-b(p-2,q)+5\times b(p-1,q)+5\times b(p,q)-b(p+1,q)\}/8 \quad (2)$$

where the image data b(p, q) is image data that is read by the line sensor 208a and located the p-th in the main-scanning and the q-th line in the sub-scanning, and the image data b'(p', q) corresponds to image data that is read by the line sensor 208b and located the p'-th in the main-scanning and the q-th line in the sub-scanning.

Correction using formula (2) as described above is three-dimensional correction that is one of the techniques of correction processing. In addition to the three-dimensional correction, other correction methods including linear correction are applicable.

In FIG. 25, the pixel-shift correction section 319 may be disposed at the former stage or the latter stage of the line memory 316 so as to carry out the pixel-shift processing on image data read by the line sensor 208b. As described in the specific examples 1 and 2, image data amount read by the line sensor 208a is overwhelmingly smaller than image data amount read by the line sensor 208b (the line sensor 208a only reads image data C1 and C3 of two lines in the specific examples 1 and 2). Consequently, it is better for reducing a load of the pixel-shift correction section 319 that pixel-shift processing is carried out on image data read by the line sensor 208a by the pixel-shift correction section 319 disposed in the pass-through path 315 as illustrated in FIG. 25.

According to at least one embodiment, when reading of an original document is temporarily stopped due to the occurrence of an intermittent operation factor, image data of an original document can be made continuous before the temporary stop of reading and after the restarting of reading without stopping the movement of a carriage or the original document every occurrence of the intermittent operation factor or without moving the carriage or the original document in the returning direction. In addition, continuous image data can be made without moving the carriage in an original document feed direction in ADF reading in which the original document cannot be fed in the returning direction. Furthermore, structural complexity and costs can be reduced by eliminating the need for AFEs and other processing units for the two line sensors because one line sensor reads an image of the original document in normal operation and the other line sensor reads a range in which the one line sensor cannot read an image in a period from reading stoppage to restarting reading.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reader, comprising:
a first line sensor that reads first image lines of an original document;
a second line sensor that reads second image lines of the original document, the second image lines being located apart from the first image lines in a sub-scanning direction, respectively; and
a control unit configured to, in the case where an abnormality occurs during reading of a first image line by the first line sensor, alternately switch reading of the first image lines by the first line sensor and reading of the second image lines by the second line sensor at a time point when a reading position of the second line sensor reaches a reading stop position of the first line sensor at which the abnormality has occurred.

2. The image reader according to claim 1, further comprising a reading scanning unit that relatively moves the original document and reading positions of the first and second line sensors, wherein
the control unit controls the reading scanning unit to continue the relative movement even when the abnormality occurs during reading of the first image line.

3. The image reader according to claim 2, wherein, when the reading position of the second line sensor reaches a reading restart position at which the abnormality has been eliminated, the control unit stops reading of the second image lines by the second line sensor and carries out reading of the first image lines by the first line sensor.

4. The image reader according to claim 2, wherein, in the case where the abnormality still occurs in reading of the first image line even when the reading position of the second line sensor reaches the reading stop position, the control unit stops the relative movement by the reading scanning unit after moving either one of the original document or the first and second line sensors in a returning direction in such a manner that the reading position of the second line sensor is located behind the reading stop position, and restarts the relative movement by the reading scanning unit when the abnormality is eliminated.

5. The image reader according to claim 2, wherein, in the case where the abnormality still occurs in reading of the first image line even when the reading position of the second line sensor reaches a position obtained by subtracting a fixed value α from the reading stop position, the control unit stops the relative movement by the reading scanning unit, and restarts the relative movement by the reading scanning unit when the abnormality is eliminated.

6. The image reader according to claim 5, wherein the fixed value α is set to a value corresponding to a moving distance from when the relative movement by the reading scanning unit is stopped until when a moving speed reaches a constant speed after restarting of the relative movement by the reading scanning unit.

7. The image reader according to claim 1, further comprising a reading scanning unit that relatively moves the original document and reading positions of the first and second line sensors, wherein
the control unit stops the relative movement by the reading scanning unit when the abnormality occurs during reading of the first image line, and restarts the relative movement by the reading scanning unit when the abnormality is eliminated.

8. The image reader according to claim 1, further comprising an image switching unit that delays output of image data of the first image line by a line-interval between the first image line and the second image line in the sub-scanning direction, and outputs the image data thus delayed.

9. The image reader according to claim 8, wherein the image switching unit sequentially inputs the image data of the first image lines to a storage unit, and sequentially outputs the image data from the storage unit after delaying output of the image data by the line-interval while the image switching unit directly outputs image data of the second image lines without inputting the image data of the second image lines to the storage unit.

10. The image reader according to claim 1, further comprising an interpolation unit that produces, by interpolation processing, image data of a skipped line excluded in each of the first and second image lines that have been read by being alternately switched.

11. The image reader according to claim 1, further comprising a correction unit that corrects a pixel-shift in a main-scanning direction between the first and second line sensors.

12. The image reader according to claim 11, wherein the correction unit corrects the pixel-shift with respect to image data of the second image line.

13. An image reading method performed in an image reader including a first line sensor that reads first image lines of an original document and a second line sensor that reads second image lines of the original document, the second image lines being located apart from the first image lines in a sub-scanning direction, respectively, the method comprising:
alternately switching, in the case where an abnormality occurs during reading of a first image line by the first line sensor, reading of the first image lines by the first line sensor and reading of the second image lines by the second line sensor at a time point when a reading position of the second line sensor reaches a reading stop position of the first line sensor at which the abnormality has occurred.

* * * * *

UNITED STATES PATENT AND TRADEMARK OFFICE
CERTIFICATE OF CORRECTION

Page 1 of 1

PATENT NO. : 8,514,466 B2
APPLICATION NO. : 13/064104
DATED : August 20, 2013
INVENTOR(S) : Inukai It is certified that error appears in the above-identified patent and that said Letters Patent is hereby corrected as shown below:

On the Title Page, Item (30) should read

(30)  Foreign Application Priority Data

Mar. 12, 2010 (JP) ..................................2010-056288
　　　　Jan. 14, 2011 (JP) ...................................2011-006053

Signed and Sealed this
Eleventh Day of February, 2014

Michelle K. Lee
*Deputy Director of the United States Patent and Trademark Office*